Figure 1:
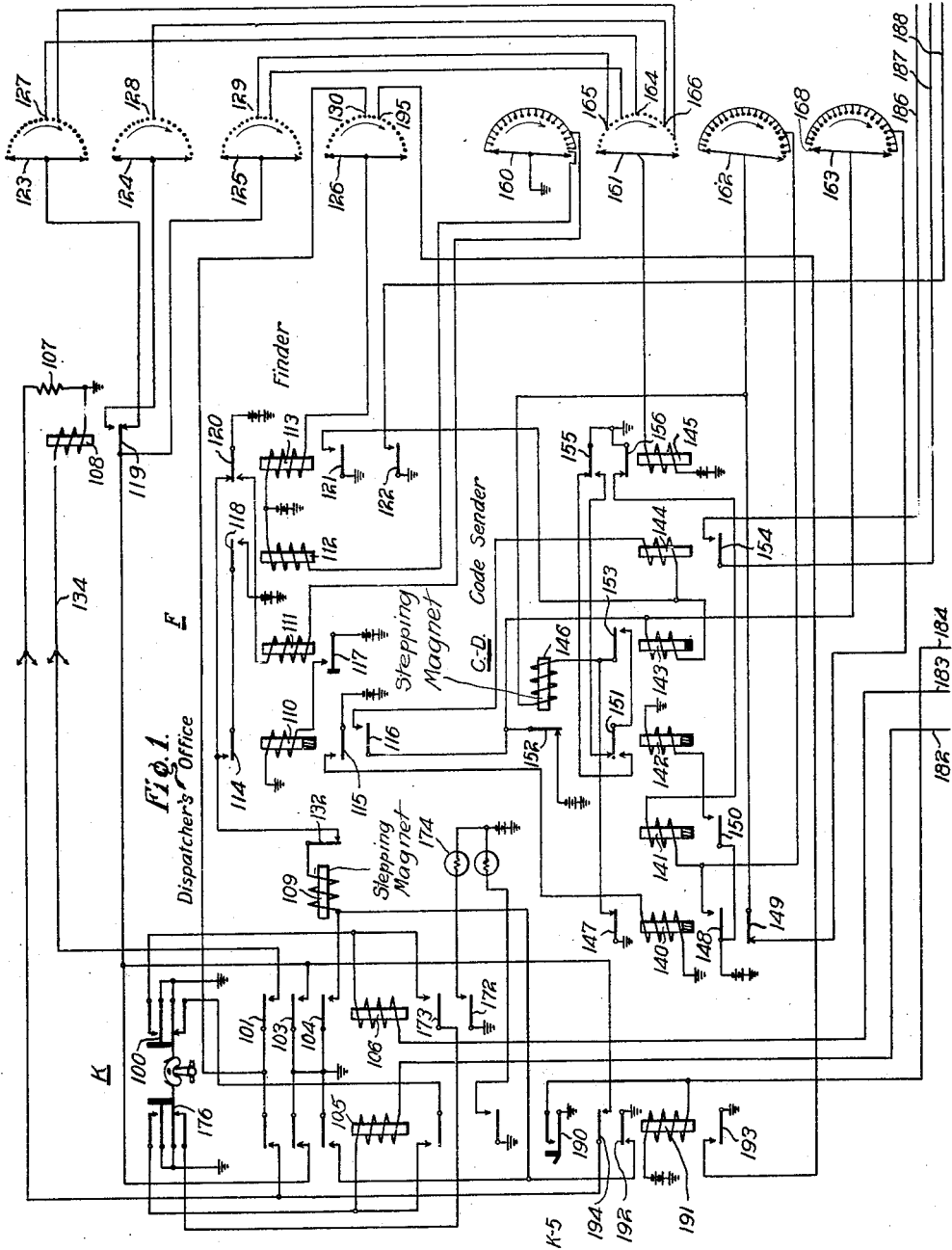

Feb. 19, 1929.

R. J. WENSLEY 1,702,423

SUPERVISORY CONTROL SYSTEM

Filed Oct. 1, 1923   12 Sheets-Sheet 4

WITNESSES:

INVENTOR
Roy J. Wensley.
BY
ATTORNEY

Substation Receiver

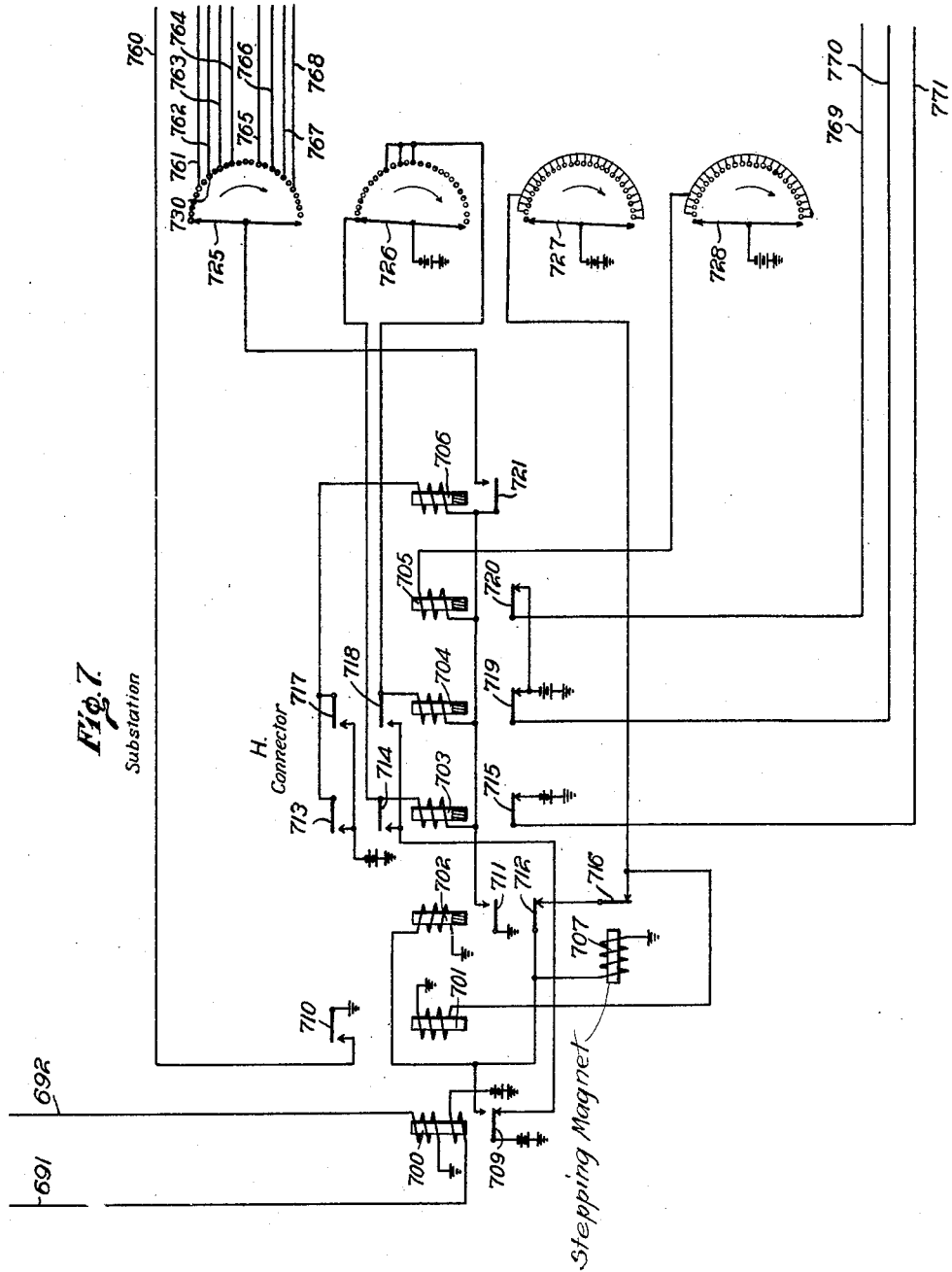

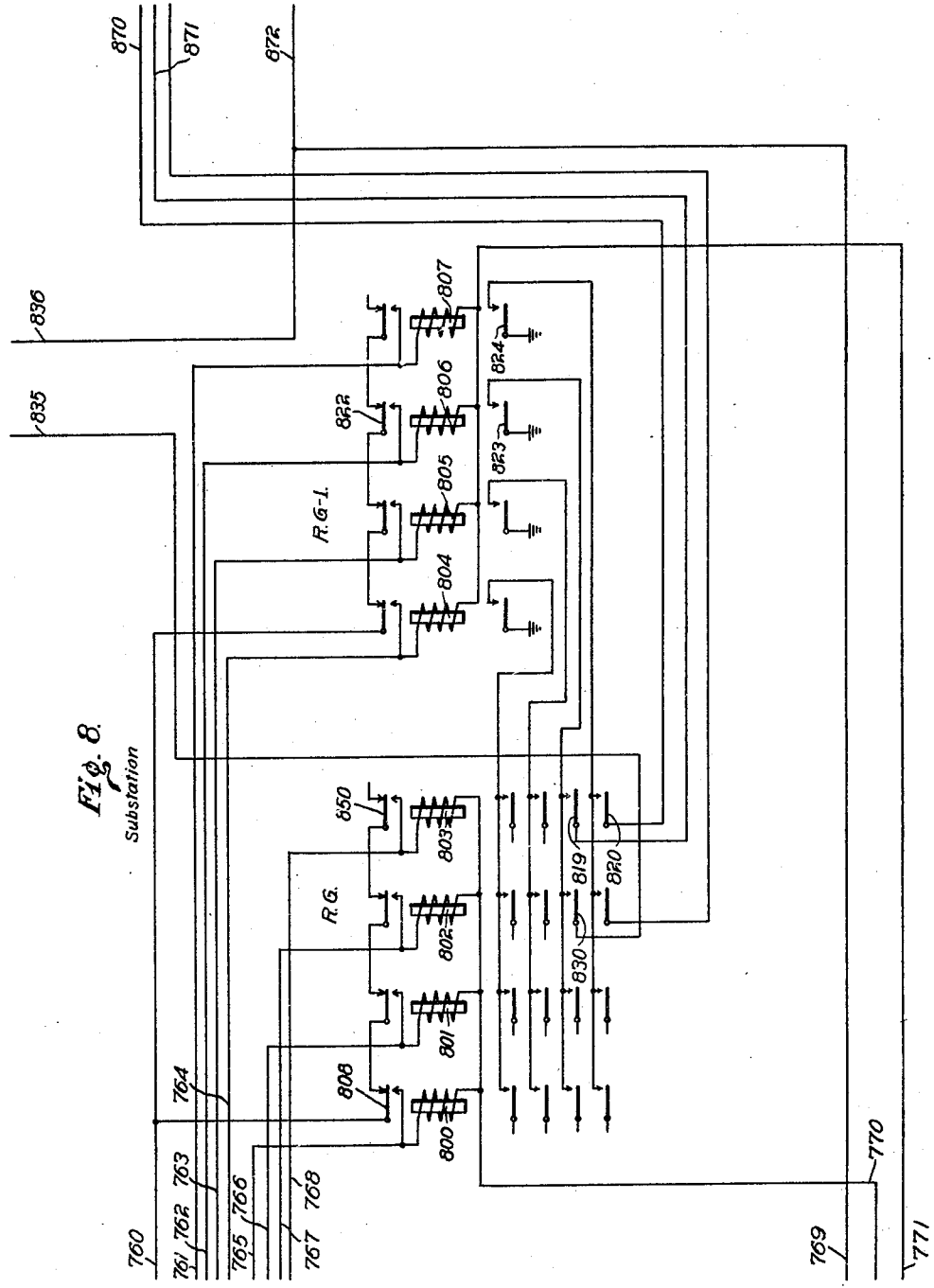

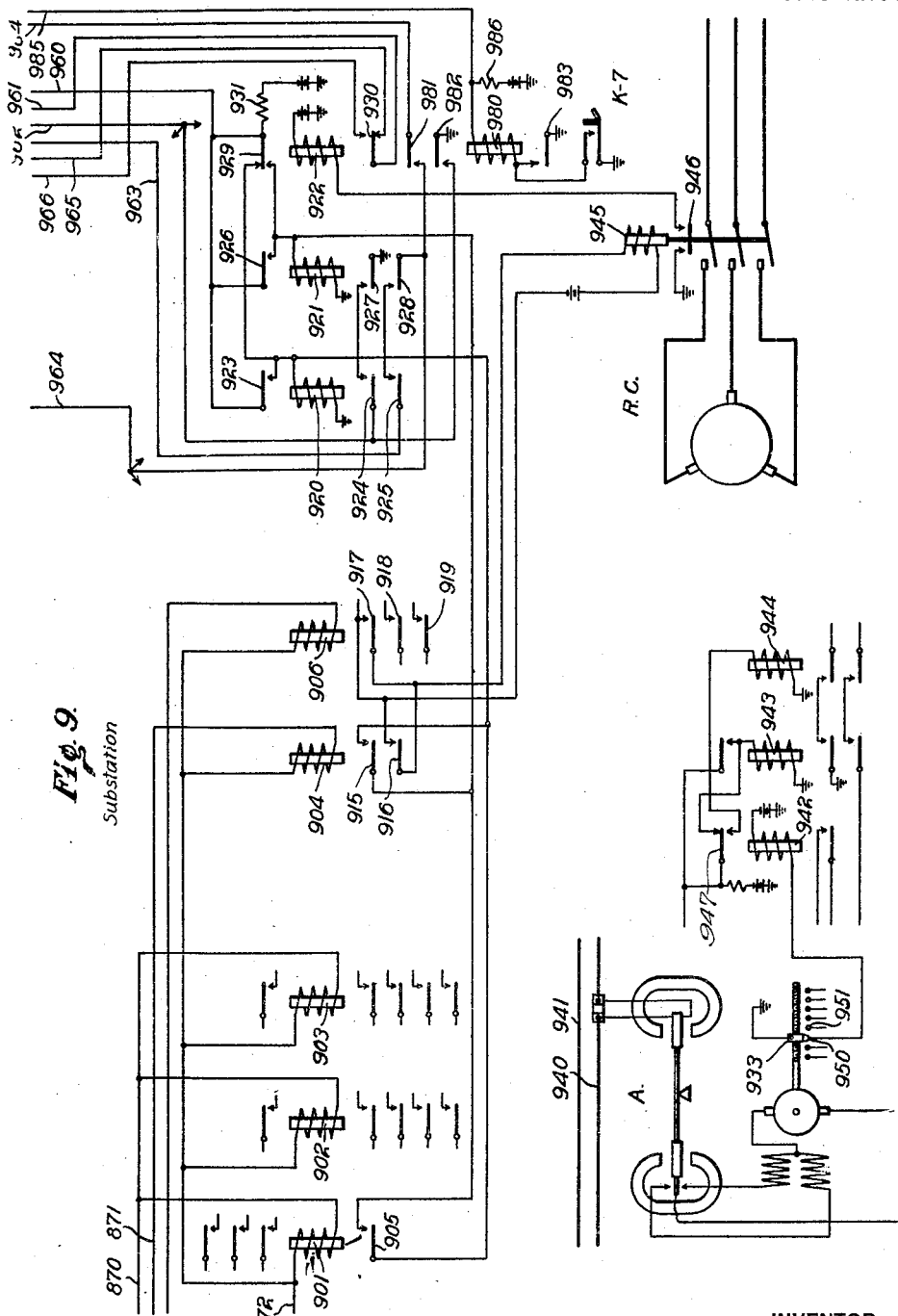

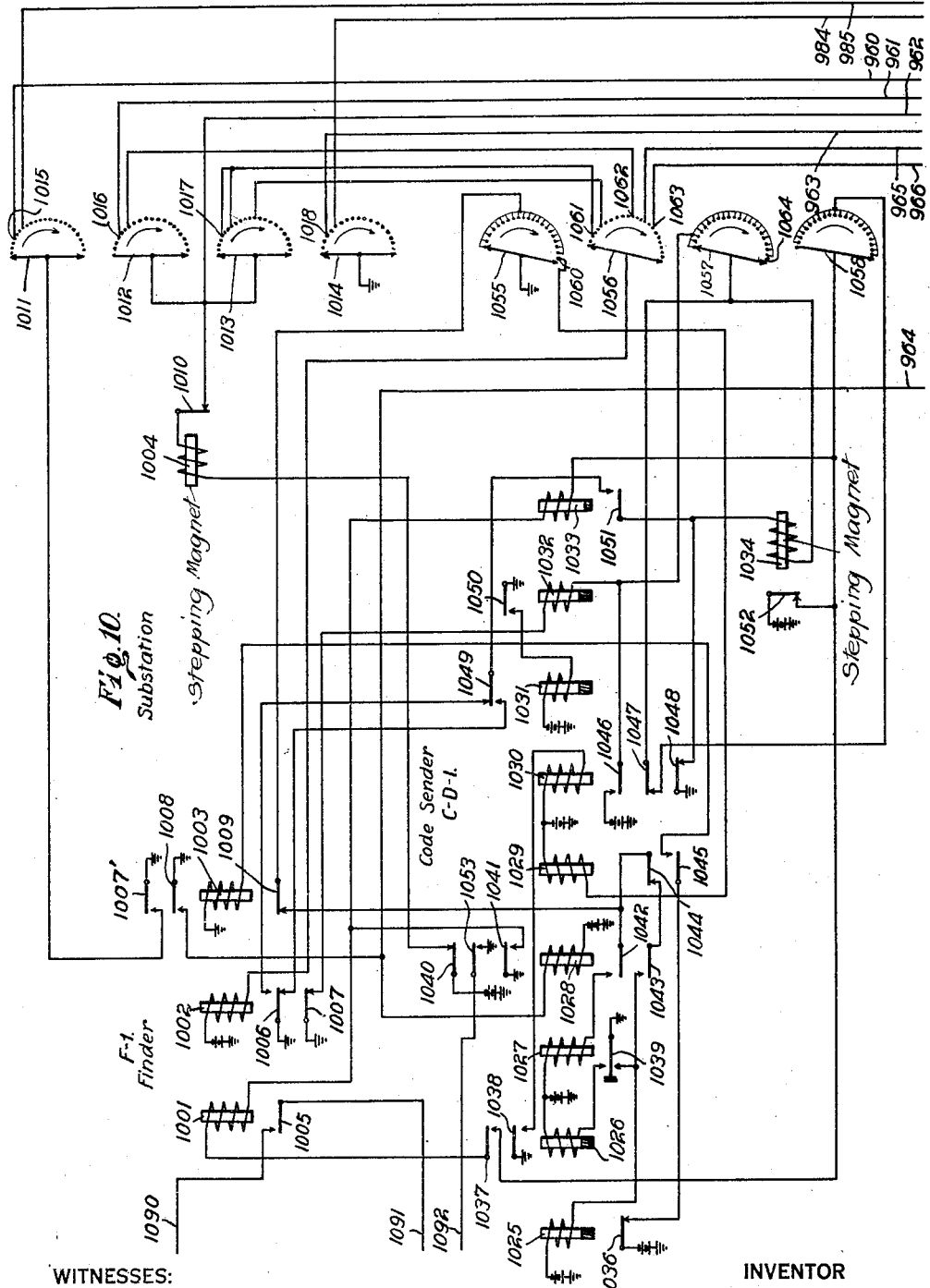

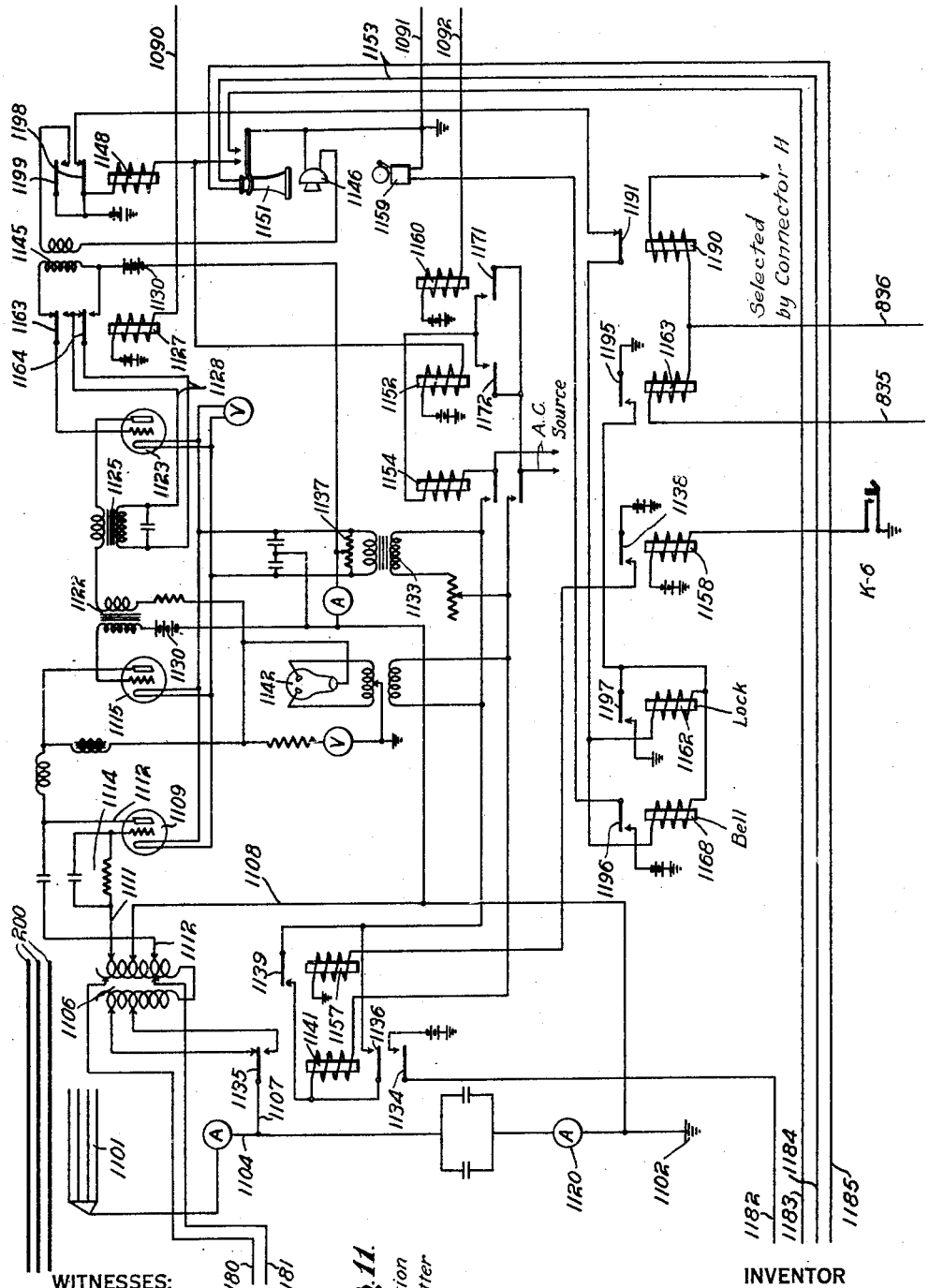

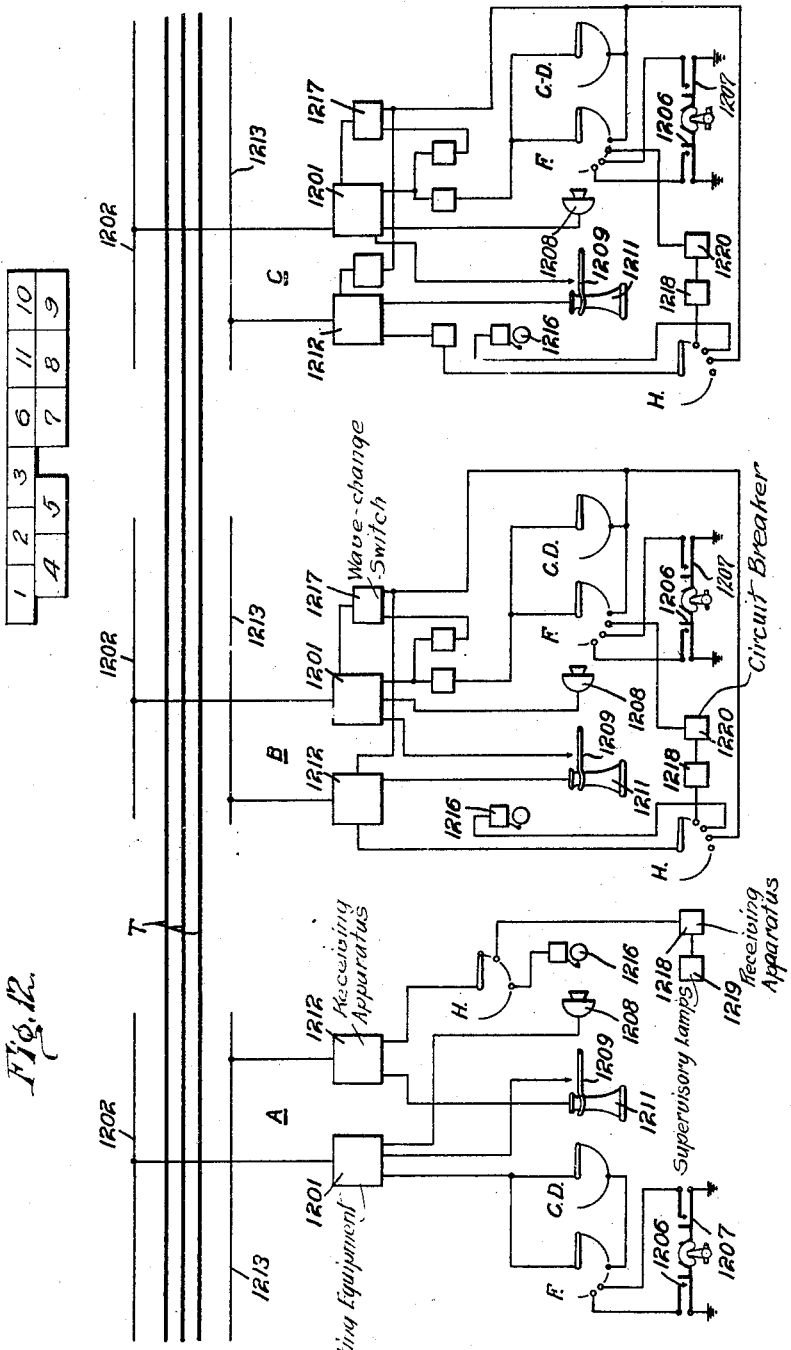

Patented Feb. 19, 1929.

1,702,423

UNITED STATES PATENT OFFICE.

ROY J. WENSLEY, OF EDGEWOOD, PENNSYLVANIA, ASSIGNOR TO WESTINGHOUSE ELECTRIC & MANUFACTURING COMPANY, A CORPORATION OF PENNSYLVANIA.

SUPERVISORY CONTROL SYSTEM.

Application filed October 1, 1923. Serial No. 665,841.

My invention relates, in general, to systems for remotely supervising and controlling the power apparatus in substations of an electrical system of distribution.

More particularly, it is the object of my invention to provide means for supervising and controlling such substations from a dispatcher's office without special direct interconnection between the dispatcher's office and the substations.

Another object of my invention is to provide a system of the above type, the operation of which will be unaffected by static line surges, inductive interference, flash over of insulators or the discharge of lightning arresters.

There are other objects of my invention, which, together with the foregoing, will be described hereinafter with reference to the accompanying drawings.

By means of my invention, it is possible to supervise and control power equipment from the dispatcher's office over the ordinary power transmission line. I accomplish this result by the use of the well-known carrier current, thereby forming a "wired" wireless control of power equipment. Of course, it is entirely possible to control the power equipment entirely without wires by space radio, using my improved system.

In order to facilitate the description of my invention, I have shown it applied to an electrical distribution system having a plurality of automatic substations for supplying energy thereto. These substations are controlled and supervised from a dispatcher's office.

It will be understood that, while I have shown my invention as applied to automatic substations, it is not limited to this use but may be used to control any equipment of any type from a remote point.

In carrying out my invention, I employ a group of signalling lamps at the dispatcher's office, there being one group for each substation, the number of lamps in the groups being determined by the number of apparatus units it is desired to control. In addition, the dispatcher's office is provided with a plurality of groups of keys, the number of groups corresponding to the number of substations and the number of keys corresponding to the number of operations it is desired to perform at each substation. In addition, at the dispatcher's office there is an automatic code-sending mechanism, consisting of a finder switch and a code-sending switch, and automatic connector switches, one for each substation. At each substation is provided a finder switch, a code-sending switch and a connector switch, these being similar to those located at the dispatcher's office.

In addition, at both the dispatcher's office and the substation, there is located a radio transmitting set and a receiving set of such construction that it will function with the power control apparatus.

Briefly, the operation proceeds as follows: It will be assumed that an apparatus unit in a substation changes its condition under automatic control. As a result of this operation, the finder switch at the substation is operated to select the apparatus unit operated. The code-sending switch then functions to send out a code corresponding to the position of the finder switch. The code is made up of impulses. These impulses serve to modulate an audio frequency generated current, produced by an additional generator, into a series of pulses of radio frequency currents. These doubly modulated impulses are radiated from one aerial to space or to the transmission line extending between the stations and are received by the receiving apparatus at the dispatcher's office. Here, the signals are detected and transformed from doubly modulated series of radio frequency impulses to a series of audio frequency impulses. These impulses are then demodulated to reproduce the original impulses at the receiving station. These detected impulses then operate the automatic connector switch associated with that substation to operate the proper signal lamps of the group assigned to that substation. In this manner, the dispatcher is informed of the operation at the substation.

The operation is somewhat similar in case the dispatcher desires to control the operation of one of the apparatus units in a substation. To accomplish this result, the dispatcher operates the proper key in the group associated with a particular substation. The automatic code-sending mechanism functions as before, as does the radio sending apparatus. The radiated radio frequency impulses are received at the substation, detected and demodulated to ordinary impulses which actuate the connector switch at the substation to select the apparatus unit. The unit is then operated and the code is sent back to change the supervisory signalling devices at the dispatcher's office whereby the dispatcher is informed of the completion of the operation.

Referring now to the drawings comprising Figures 1 to 12, inclusive, I have shown, by means of conventional circuit diagrams, sufficient of the circuits and apparatus to enable my invention to be readily explained and understood.

Figs. 1 to 11, inclusive, when placed in the order shown in Fig. 13, with corresponding lines at the ends thereof in alinement, illustrate the circuits of my complete system. Figs. 1 to 5, inclusive, are diagrammatic views of the equipment located in the load dispatcher's office, while Figs. 6 to 11, inclusive, are similar views of the selector and control equipment in an automatic substation of the electrical distribution system.

Fig. 12 is a diagrammatic view of my invention applied to an electrical system of distribution having two substations and one dispatcher's office.

Referring now more particularly to Fig. 12, the general outline of the system will first be discussed. At A is indicated the load dispatcher's equipment, while B and C are two substations located along the transmission line. There is no direct metallic connection between the load dispatcher's office A and the substations B and C.

The switching apparatus in the substations B and C is controlled by a carrier current which is superimposed upon the transmission line E extending from the load dispatcher's office A to the substations B and C. At the load dispatcher's office, the transmitting equipment 1201 is connected to the serial 1202. The transmitting equipment 1201 is controlled by a code-sending switch CD and the finder switch F which, in turn, are actuated by the calling keys 1206 or 1207. In order to transmit voice currents as well as control impulses, a telephone transmitter 1208 is adapted to modulate the carrier waves generated by the transmitting apparatus 1201 when the receiver 1211 is raised from the switch hook 1209. The receiving apparatus 1212 is connected to the receiving aerial 1213 in any well known manner. The output of the receiving apparatus 1212 is received by the telephone receiver 1211 or by the connector switch H which, in turn, actuates an alarm 1216, or other control apparatus 1218. The control apparatus 1218, in turn, operates the supervisory signals which are indicated at 1219.

The substation B contains apparatus similar to that shown in station A. The similar apparatus in both stations are correspondingly numbered. In addition to the ordinary sending and receiving equipment described, the substation B contains a wave-change switch 1217 which is adapted to be controlled by an operator at the substation to change the wave length or frequency of the sending apparatus 1201. The substation C contains apparatus similar in every respect to the apparatus shown in substation B.

In outline, the operation of the apparatus shown in Fig. 12 proceeds as follows: It will be assumed that the dispatcher desires to operate a circuit breaker at the substation B. In order to accomplish this result, he will operate the key 1206 which will cause the finder switch F to operate to find the particular key operated. The code-sending switch CD then operates to generate a certain number of impulses at a relatively low frequency. These low frequency impulses interrupt an audio frequency modulation of the ordinary short-wave carrier current. The apparatus which performs these functions is indicated at 1201. The modulated short-wave carrier current is radiated by means of an aerial 1202 and directed along the transmission line T. These radiated waves are received at the substations B and C by means of the aerials 1213. The receiving apparatus 1212 functions to demodulate the received vibrations into a series of interrupted audio frequency vibrations. These interruptions in the audio frequency vibrations are translated into impulses of a relatively low frequency and serve to actuate the connector switch H to operate, through the intervening control equipment 1218, a circuit breaker or other apparatus unit, which is indicated at 1220.

The operation of the apparatus unit causes the finder switch F at the substation to associate itself with the unit. The code-sending switch CD then operates to generate a series of low frequency impulses which serve to interrupt the audio frequency modulation of the short-wave carrier currents, as before, which are received at the dispatcher's office A by means of the receiving aerial 1213. The wave length or frequency of the short-wave carrier current is different from the frequency of the carrier current generated by the sending apparatus 1201. Consequently, there is no interference between the two. At the dispatchers' office, the receiving apparatus 1212 functions in a manner similar to the apparatus 1212 at the substation and translates the interrupted modulation of the short-wave carrier current into a series of low frequency impulses which actuate the connector switch H. This switch operates, through the intermediate control apparatus indicated at 1218, supervisory lamps associated with the particular breaker or apparatus unit at the substation, which has been operated. The change in supervisory signals apprises the dispatcher of the completed operation of the unit at the substation.

My invention also contemplates the interconnection of the dispatcher's office A and the substation B or C for telephone purposes. In the event that the dispatcher at office A desires to communicate with a party who may be at substation B, the dispatcher will operate key 1207 which causes certain interruptions in the audio frequency modulation radiated carrier wave in substantially the same manner as before. The receiving apparatus at substations B and C responds and causes the operation of the connector switches H to a certain point. However, inasmuch as the signalling device 1216 at substation B is the only one that is connected at this particular position of the connector switches, the operation of the connector H at substation C has no particular function.

The operation of the signalling device 1216 summons the operator at substation B. The dispatcher will, of course, remove the receiver 1211 from the switch 1209, thereby placing the transmitter and receiver in proper relation to the sending apparatus 1201 and the receiving apparatus 1212. The operator at substation B will respond by removing the receiver 1211 from the switch 1209, thereby placing the transmitter 1208 and the receiver 1211 in proper relation to the receiving apparatus 1212 and the sending apparatus 1201. The parties may now communicate as if connected by a direct telephone line, the circuits being so arranged that the parties may talk in either direction without performing any manual operation, as will appear subsequently. The circuits are so arranged that the operation of the signalling device 1216 is stopped by the removal of the receiver 1211 from the switch 1209 at substation B.

My invention also makes provision whereby the operator at the substation B may signal the dispatcher at the office A or an operator at substation C. To signal the dispatcher's office A, the operator at substation B will operate a key, such as 1207, which will cause the operation of the finder switch F and the code-sending switch CD to control the functioning of the radio sending equipment 1201, the radio receiving equipment and the connector H at the dispatcher's office. All these operations and the subsequent ones proceed as before described.

To signal the substation C, the operator will operate a key, such as 1206. The operation of this key causes the finder switch F to operate to find the key. The operation of the key also causes a wave-changing device 1217 to operate to change the wave length of the sending apparatus 1201 at substation B, so that it operates on the same wave length as the sending apparatus 1201 at the dispatcher's office A. Thus, the substation C may be communicated with, and controlled from, substation B in substantially the same manner as from the dispatcher's office A.

In the same manner, the substation C may signal and communicate with the dispatcher's office A and the substation B.

Referring now more particularly to Fig. 1, in the upper left-hand corner thereof is shown a key K. This key is one of several groups of keys and is of the ordinary double-throw type. The switch F is a finder switch of the usual rotary type, the wipers of which move in a forward direction only. The finder switch F is provided with four wipers 123 to 126, inclusive, each of which is adapted to engage a bank contact comprising twenty-five contact members. The wipers of the finder switch F have no normal position. The mechanical construction of the finder switch shaft is similar to the mechanical construction of the rotary switch disclosed in the patent to Clement No. 1,107,153. The switch CD is a code-sending switch similar in mechanical construction to the finder switch F. On account of differences in circuit design, the switch CD is rotated to normal position at the end of each operation.

Figure 2:
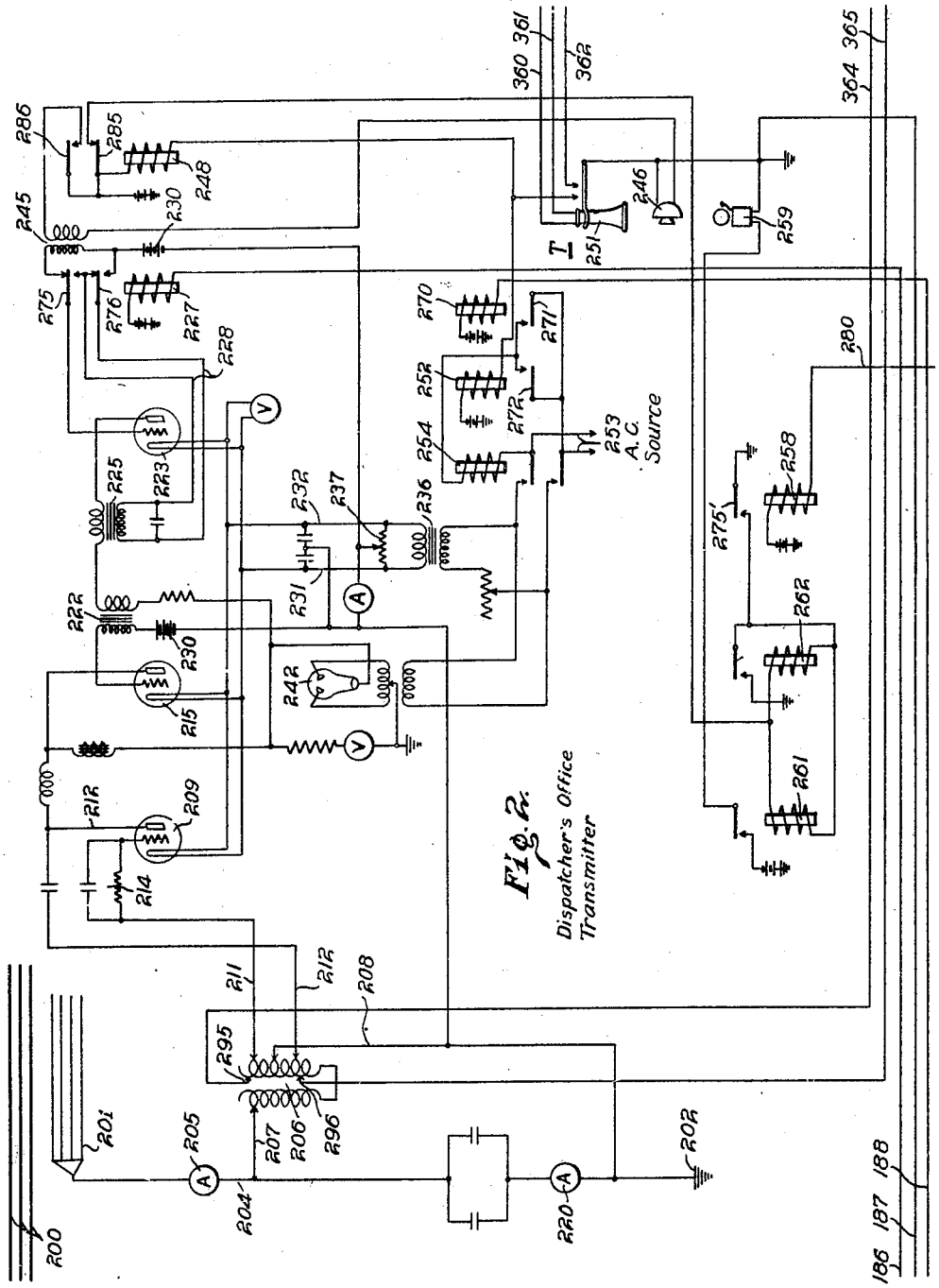

In Fig. 2 there is indicated a transmission line 200, which may be used for distributing electrical energy to various points in the system. Disposed below this is a high frequency radiator 201 which is connected to ground at 202 by the conductor 204. The conductor 204 contains an ammeter 205 registering the aerial current and an ammeter 220 for registering aerial current plus the local oscillatory current. A coil 206 forms part of the local oscillatory circuit connected by conductors 207 and 208 to the aerial circuit and to the ground circuit, respectively. A triode 209 for generating radio frequency oscillations is connected by the conductors 211 and 212 to a portion of the coil 206. The conductor 211 contains a grid leak and grid condenser 214. The triode 215 is an ordinary vacuum tube for amplifying the output of a modulating triode 223. Alternating current is supplied over the conductors 253, when the relay 254 is operated, for energizing the filament of the triodes 209, 215 and 223, the voltage, of course, being reduced to proper value by the transformer 236. A rectifier of the mercury arc type 242 is provided for supplying direct-current to the plates of the different triodes.

It will be seen that, in general, the circuits including the triodes 209, 215 and 223 are arranged for the modulating of radio frequency currents. It will be noted that the oscillations of the triode 223 may be controlled by the telephone transmitter 246 when the relay 248 is operated. The triode may also oscillate automatically at audio frequency when the relay 227 is operated and the howler transformer 225 is connected in the circuit. The relay 227 is connected to the code-sending switch CD and functions in a manner to be described subsequently. The relays 270, 252 and 254 control the energizing circuits of the triodes 209, 215 and 223. The relays 261, 262 and 258 control the operation of the receiving apparatus, as will appear.

The potentiometer 237 is connected between the conductors 231 and 232 and its middle point serves as a connection for the negative terminal of the high-voltage direct-current source to the various grid circuits. At T is indicated an ordinary telephone circuit, the transmitter of which may be connected, by means of a transformer 245, in proper relation to control the oscillation frequency of the modulation triode 223.

Figure 3:
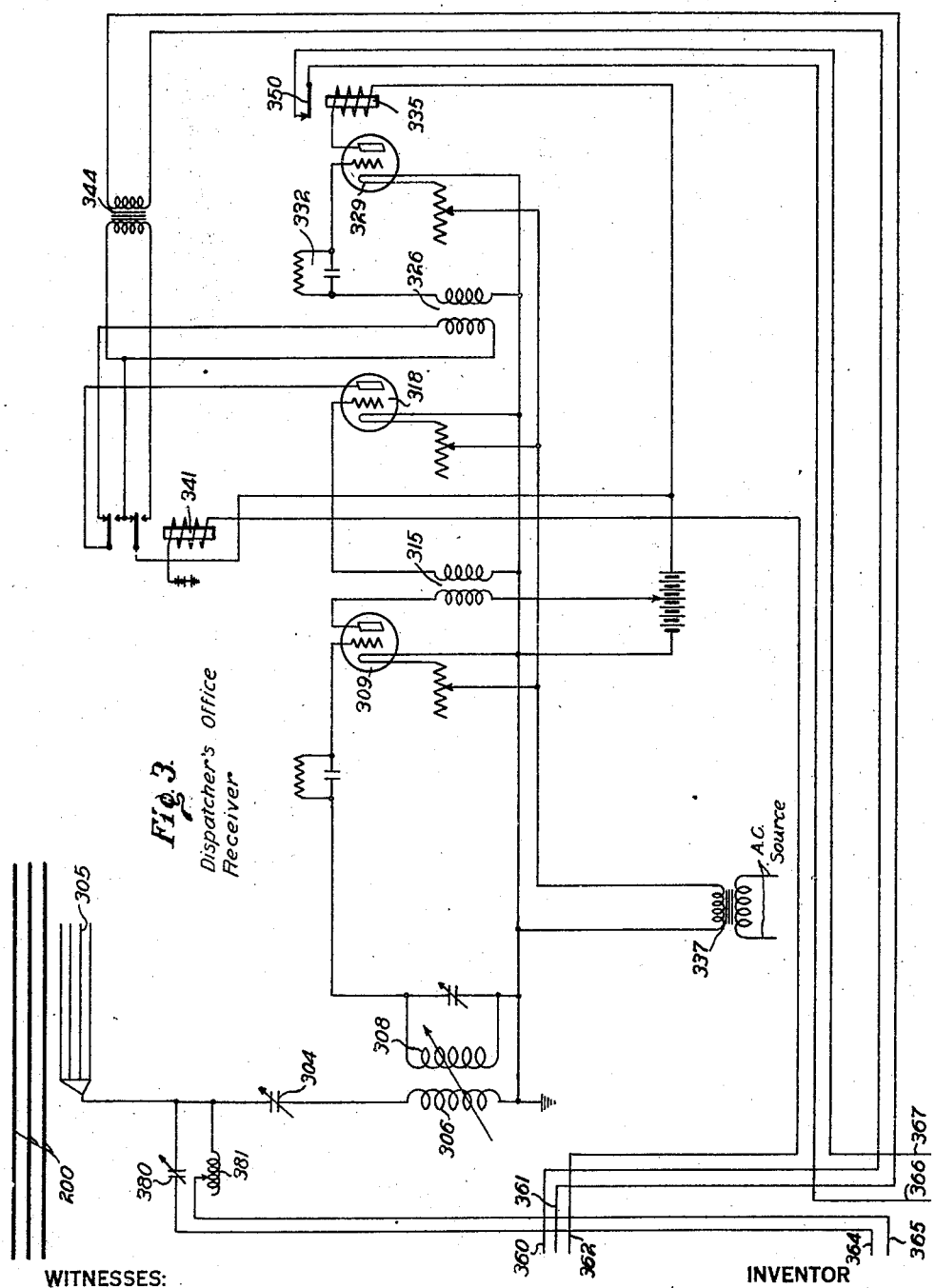

In Fig. 3 is shown the receiving apparatus at the dispatcher's office. This comprises a receiving aerial 305 which is disposed below the transmission line 200. The aerial 305 is connected through the series condenser 304 to the radio frequency inductance 306. This, in turn, is connected to ground. The radio frequency inductance 306 is the primary of the radio frequency transformer, of which radio frequency the inductance 308 is the secondary therefor and in inductive relation to the inductance 306.

The receiving set is, in general, similar to well-known radio receiving systems having the detector triode 309, the audio frequency amplifier triode 318 and a third triode 329. The triode 329 is connected in the circuit after the manner of a detector. It functions to rectify the amplified audio frequency currents. With the triode 329 connected in this manner, it is necessary to change the constants of the grid leak and condenser 332, inasmuch as the triode operates at a relatively low frequency. The filaments of the triodes are energized from a source of alternating current (not shown) through the transformer 337.

It will be noted that the plate of the triode 329 is connected through the relay 335 to the positive side of the high-voltage, direct-current source. The relay 335 controls the operation of the connector switch H—1 in Fig. 5.

Figure 4:
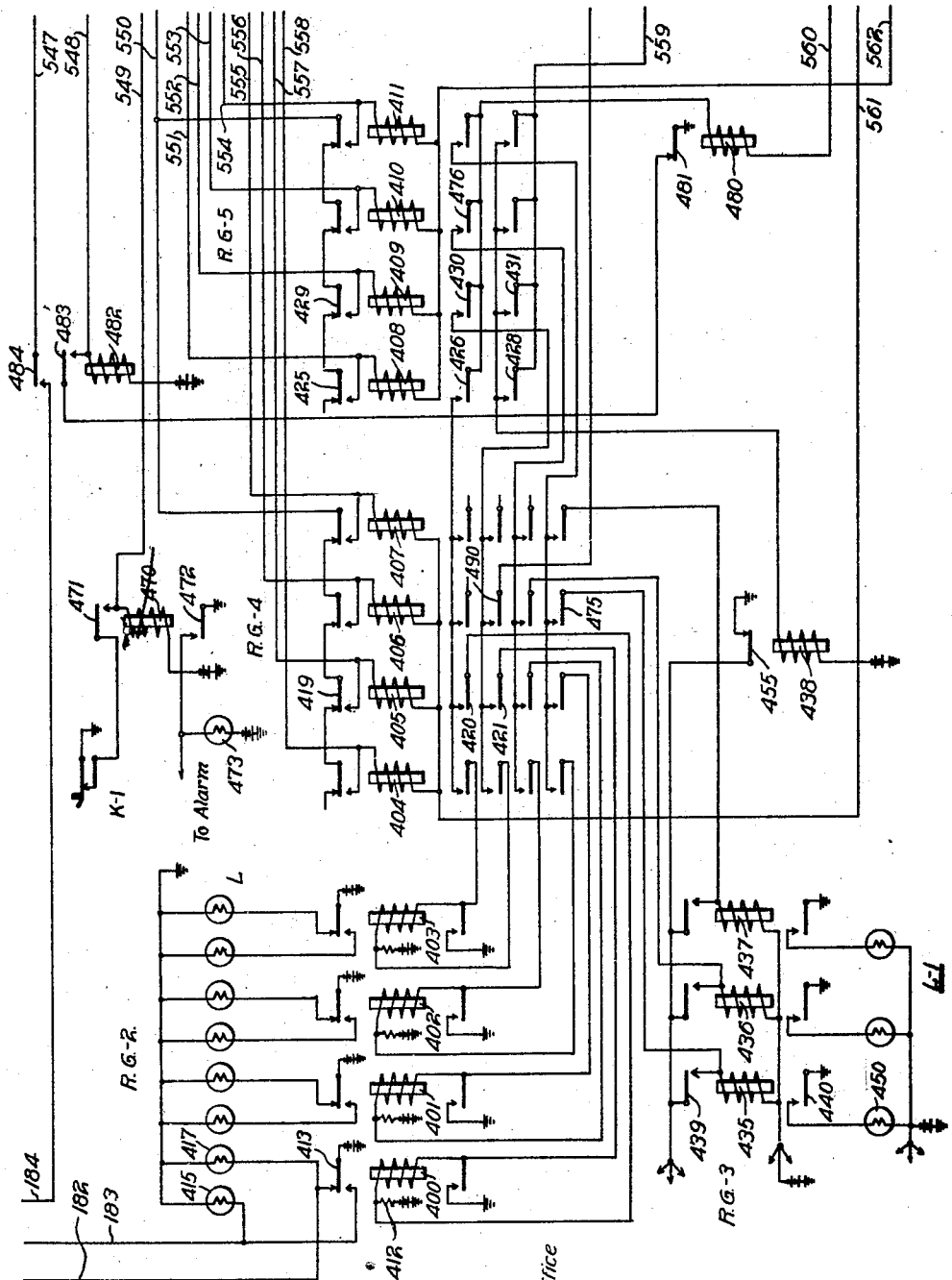

Fig. 4 shows relay groups RG—4 and RG—5. These are selective relay groups, the relay group RG—5 being the primary selecting group and the relay group RG—4 being the secondary selecting group.

The relays 400 to 403, inclusive, control the operation of the supervisory lamps L. The relay group RG—3 comprises relays for controlling the load indicating lamps, such as are shown at L—1.

Figure 5:
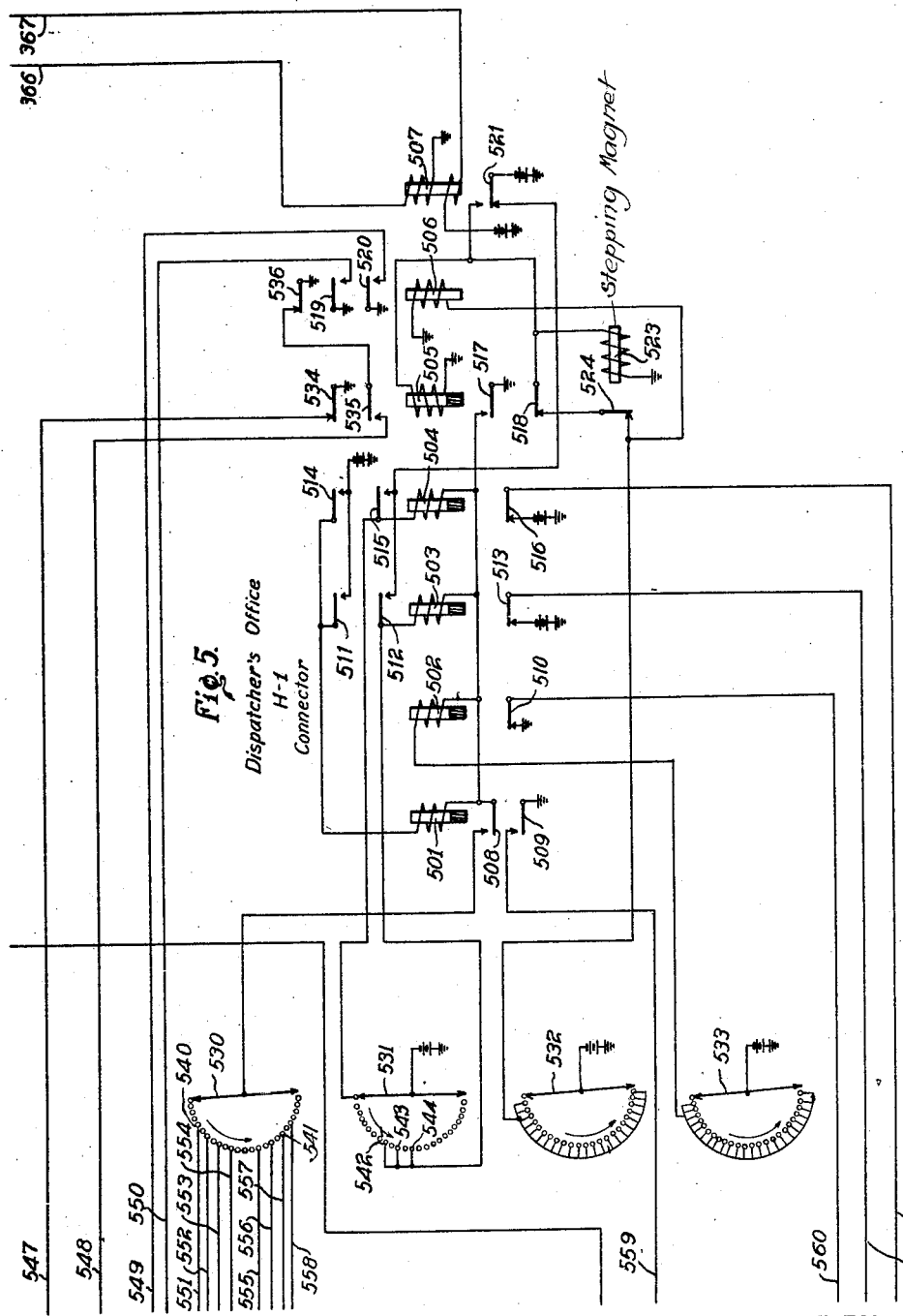

In Fig. 5, there is shown a connector switch H—1. This switch is of the same mechanical construction as the finder switch F. However, the circuits have been so designed as to enable it to be directively controlled.

Figure 6:
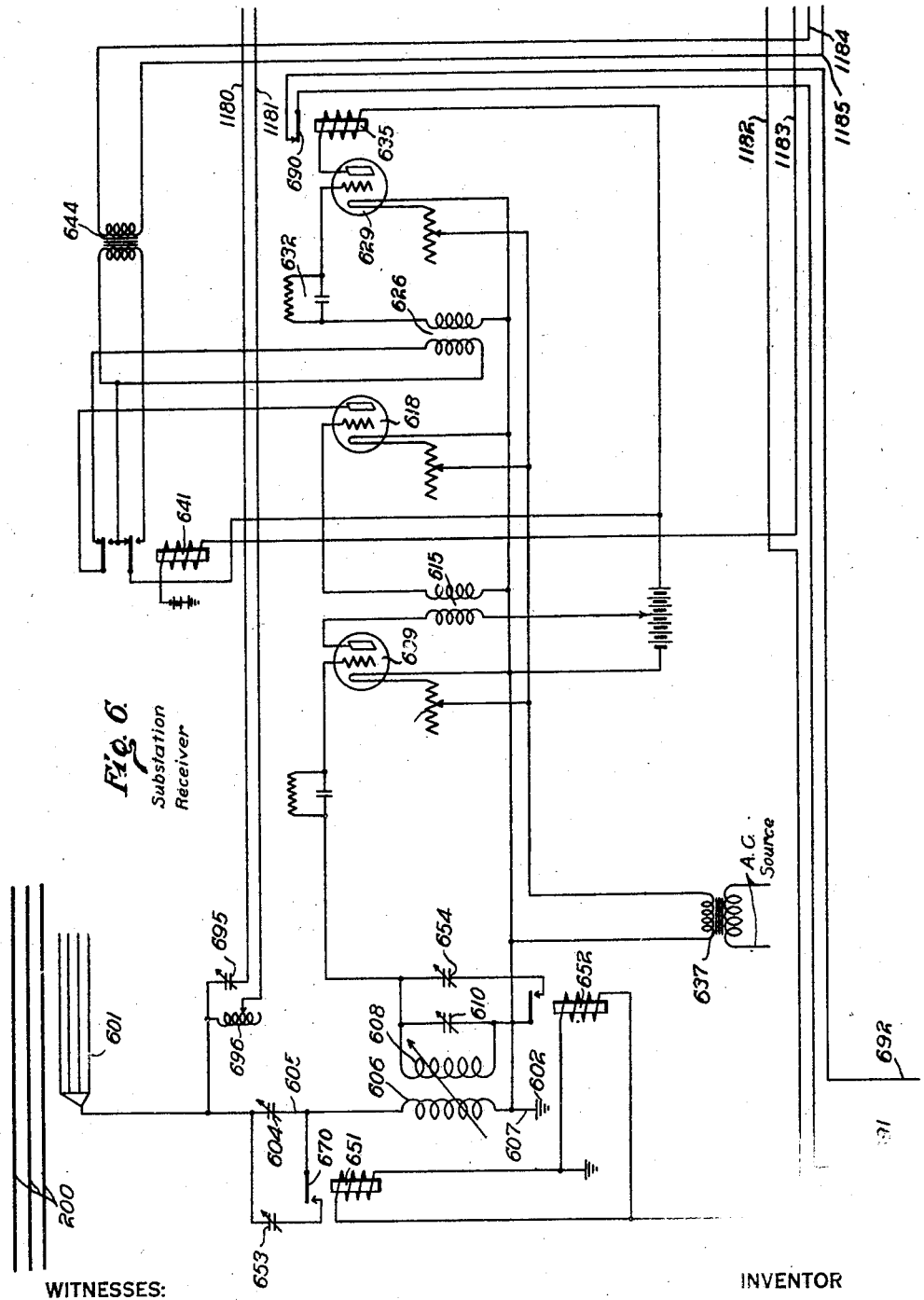

In Fig. 6 is shown radio receiving apparatus which is similar to the receiving apparatus shown in Fig. 3. The only difference between the two figures is that, in Fig. 6, the relays 651 and 652 are provided for changing the normal wave length of the receiving station to the same wave length as that of the receiving apparatus at the dispatcher's office. The reason for this has been described.

The connector switch H shown in Fig. 7 is similar in all respects to the connector switch H—1 (Fig. 5) previously described.

The relay groups RG and RG—1 of Fig. 8 are selecting relays controlled by the connector switch H, the relay group RG—1 being the primary selecting group and the relay group RG being the secondary selecting group.

The relays 901 to 904, inclusive, in Fig. 9, are those selected by the operation of the selecting relays of Fig. 8. The contactor 945 may be any one of the contactors in the substation. Relays 920 to 922, inclusive, are provided for the purpose of controlling the operation of the finder switch F—1 (Fig. 10) in accordance with the position of the contactor 945. An ammeter A of the well-known Kelvin balance type is connected to an ammeter shunt of the direct-current supply busses 940 and 941 and operates to shift the contact maker 933 in accordance with the current traversing the busses. The contactor 945 serves, in conjunction with other devices (not shown), to cause the functioning of the rotary converter RC.

In Fig. 10 is shown the finder switch F—1 and the code-sending switch CD—1. These switches are very similar to the switches F and CD previously described.

In Fig. 11 is shown the radio transmitting apparatus located at the substation. This apparatus is substantially the same as the dispatcher's radio transmitting apparatus shown in Fig. 2. There is a slight difference, however, which consists in the provision of relays 1141, 1157 and 1158 for changing the wave length or frequency of the radiated short-wave carrier current. By the operation of these relays, the normal wave length of the carrier current is changed to the frequency of the short waves radiated from the transmitting station. The reason for this has been described.

Having briefly described the apparatus shown in the drawings, I will now describe its detailed operation. In order to do this, it may be assumed that the contactor 945 at the substation closes. The closing of the contactor 945 may occur in response to certain conditions brought about by the operation of the ordinary automatic controlling equipment at the substation. The equipment has not been shown in the drawings, as it is well known.

When the contactor 945 operates, a circuit is closed which may be traced from ground by way of the spring 946, and through the winding of the relay 922 to battery. The relay 922 is energized by this circuit and, upon operating, at its armature 929 closes a circuit for the relay 921. The relay 921 is energized and attracts its armatures. Prior to this time, the relay 920 has been energized as a result of the relay 922 being inoperative. When the relay 922 was energized, the relay 920 did not retract its armatures, because of the fact that it had established a locking or holding circuit for itself at armature 923.

When the relay 921 is energized, it operates to establish a locking circuit for itself at armature 926 from ground through the winding of relay 921, front contact and armature 926 and battery to ground and to close a circuit which may be traced from ground by way of the armature 927 and its front contact, the front contact and the armature 924, the common conductor 962, the back contact and the armature 1010, through the winding of the stepping magnet 1004, and thence to the battery by way of the back contact and the armature 1040 of the relay 1028. The stepping magnet 1004 is immediately energized to place its pawl in position to actuate the switch shaft upon its deenergization and, at armature 1010, to open its own circuit. As the magnet 1004 interrupts its own circuit, it intermittently operates to advance the switch wipers 1011 to 1014, inclusive, step by step, until said wipers are brought into engagement with the bank contact members 1015 to 1018, inclusive. In this position, a circuit is completed extending from ground by way of the wiper 1014 and its associated bank contact 1018, the conductor 963, the armature 925 and its front contact, the front contact and the armature 928, the common conductor 964, and through the winding of the relay 1028 to the battery. The relay 1028 is immediately operated from this circuit.

As a result of the energization of the relay 1028, the circuit of the stepping magnet 1004 is opened at armature 1040 and, at armature 1041, a circuit is completed which extends from ground by way of the said armature and its front contact, through the winding of the slow-release relay 1033, and thence to the battery by way of the back contact and the armature 1052. Another result of the energization of the relay 1028 is that a circuit is closed through ground by way of the wiper 1055 and its associated bank contact, the armature 1009 and its back contact, the armature 1042 and its front contact, and through the winding of the relay 1027 to the battery. Another circuit in parallel with that described above, except that it goes by way of the armature 1044 and its back contact and the armature 1043 and its front contact, may be traced for energizing the relay 1025. The relay 1027, upon operating, at its armature 1039 closes a circuit for the relay 1026.

At this point, it may be well to mention the peculiar construction of the armature 1039 of the relay 1027. The armature 1039 is weighted and is so constructed that, when the relay 1027 is deenergized, the armature 1039 vibrates for some time on account of its momentum. The adjustment between the front and back contacts is so made that the armature 1039, in decreasing the amplitude of its operation, first permanently opens the circuit of the relay 1025. The operation of the relay 1025 is without particular function at the present time. The relay 1026, upon operating, at its armature 1038 closes a circuit for the relay 1030 and at its armature 1037 establishes a circuit which extends from ground by way of the armature 1041 and its front contact, through the winding of the repeating relay 1001, the armature 1037 and its front contact, and thence to battery, by way of the back contact and the armature 1052 on the stepping magnet 1034 of the code sending switch CD—1.

The relay 1030 is energized from the previously traced circuit and, upon operating, it closes a circuit at armature 1046, which extends from the battery, by way of the front contact and the armature 1046, through the winding of the slow-release relay 1032, and thence to ground, by way of the back contact and the armature 1007. The relay 1032, upon operating, at armature 1050 closes a circuit for the slow-release relay 1031. By the operation of the relay 1031, a circuit is completed which extends from ground by way of the armature 1006 and its back contact, the front contact and the armature 1051, through the winding of the magnet 1034, the wiper 1057 and its associated bank contact, and thence to battery, by way of the armature 1046 and its front contact. The magnet 1034 is energized over this circuit and operates to place its pawl in such position as to operate the switch shaft upon its deenergization. Another result of the energization of the magnet 1034 is that the circuit of the slow-release relay 1033 is opened as is, also, the circuit of the repeating relay 1001.

When the circuit of the relay 1028 is closed, as previously described, the relay 1160 of the radio transmitting set is energized over a circuit extending from ground by way of the front contact and armature 1053, the conductor 1092, and through the winding of the relay 1160 to battery. The operation of the relay 1160 closes the circuit of the relay 1154, thereby connecting the source of alternating current to the rectifier 1142 and to the filaments of the various triodes 1109, 1115 and 1123. The current supplied to the filaments of the triodes is reduced by means of the the transformer 1133 to the desired potential. The rectifier 1142 operates to place a high direct-current potential upon the plate circuits of the various triodes. The oscillator 1109 is placed in operation and radiates a continuous wave of a certain radio frequency by means of the aerial 1101. Inasmuch as this aerial is placed in inductive relation to the transmission line 200, the radiated wave is directed over the transmission line and is received by means of the receiving aerial 305 of the receiving set at the dispatcher's office. The filaments of the various triodes at the receiving station are normally energized and, consequently, may be affected by the received short wave train.

Returning now to the operation of the code sending switch CD—1, it will be remembered that, upon the energization of the relay 1026, a circuit is also closed for the relay 1001. The operation of this relay causes the energization of the relay 1127 of the radio transmitting equipment over a circuit extending from ground by way of the conductor 1091, armature 1005 and its front contact, conductor 1090, and through the winding of the relay 1127 to battery. The energization of the relay 1127, at armature 1163, connects the grid of the modulator 1123 to one side of the primary of the transformer 1125 and connects armature 1164 the other side of the primary of the transformer to the positive pole of the grid biasing battery 1130. As a result of this operation, the modulator tube 1123 is started into oscillation at a frequency determined by the constants of the circuit designated by the numeral 1128 and which, for the purposes of this invention, is an audio frequency.

It will be noted that the secondary of the transformer 1125 is connected in inductive relation, by means of transformer 1122, to the grid of the amplified triode 1115. The transformer 1125 is ordinarily called a howler transformer. The frequency of oscillation of the tube 1123 is in the audible range and, consequently, the short-wave train generated by oscillator 1109 is modulated in accordance with the audio frequency amplified oscillations from the triode 1123. This superimposes upon the short carrier wave the audio frequency vibration set up by the oscillator 1123.

Referring now to the receiving station at the dispatcher's office, shown in Fig. 3, the effect of these superposed audio frequency oscillations will be explained. The triode 309 is connected in circuit after the manner of an ordinary detector and this detects the superposed audio frequency vibrations and transmits them to the grid of the amplifying triode 318 by means of the audio frequency transformer 315. The triode 318 merely acts as an amplifier and transfers the amplified audio frequency vibrations to the triode 329, which, it will be noted, is connected in circuit after the manner of an ordinary detector. It will be seen that the relay 335 is connected in the plate circuit of the triode 329. This relay is normally energized by the plate current flowing. The received audio frequency oscillations when rectified by the triode 329 cause a great decrease in the normal plate current and, consequently, the relay 335 retracts its armature 350 whenever audio frequency modulated short waves are received. The relay 335, upon retracting its armature, closes a circuit extending from ground through the upper winding of the line relay 507 of the connector H—1 (Fig. 5), conductor 366, armature 350 and its back contact, conductor 367, and through the lower winding of the relay 507 to battery.

The relay 507 is energized over this circuit and, upon operating, at its armature 521 establishes a circuit for the slow-release relay 505. The energization of the relay 505 opens one point of the release circuit at armature 518, and at armature 534 opens a certain circuit which will become effective later. The operation of the armature 517 of relay 505 also closes a circuit which extends from ground by way of said armature and its front contact, through the winding of the slow-release relay 504, the bank contact with which the wiper 531 is in engagement and the said wiper, and thence to battery. The relay 504, upon being energized, prepares another circuit for itself at armature 515, and at armature 514 closes a circuit for the relay 501. The energization of this relay places ground upon the wiper 530. Another result of the operation of the relay 505 is that, armature 535, a circuit is completed extending from ground by way of the armature 536 and its back contact, the armature 535 and its front contact, the conductor 548, and through the winding of the relay 482 to battery. The relay 482, upon operating, establishes a locking circuit for itself at armature 483, and, at armature 484, prepares another circuit, which will be described later.

It will be noted that, when the relay 507 is first energized, the magnet 523 of the switch is also operated. The operation of the magnet 523 merely places its pawl in such a position that it may actuate the switch shaft upon its deenergization.

Returning to the operation of the code-sending switch CD—1, Fig. 10, when the circuit of the relay 1001 is opened by the energization of the magnet 1034, previously described, this relay is deenergized to open the circuit of the relay 1127 of the radio transmitting apparatus. The deenergization of the relay 1127 opens the oscillating circuit of the modulator tube 1123 and, consequently, interrupts the audio frequency modulation of the radiated short wave train. At the dispatcher's office, this interruption in the audio frequency modulation causes the energization of the relay 335 in the plate circuit of the triode 329, due to the fact that there is practically no energy transferred by means of the transformers 315 and 326 and normal current flow is established through the winding of the relay. The energization of the relay 335 opens the circuit of the line relay 527 of the connector H—1. By the retraction of the line relay armature 521, the circuits of the slow-release relay 505 and also of the stepping magnet 523 are opened. The stepping magnet 523 deenergizes to advance the switch wipers 530 to 533, inclusive, into engagement with the first set of bank contacts. The movement of the connector H—1 from its normal position closes the circuit for the relay 506 at wiper 532. The relay 506, upon operating, places ground upon the conductor 550 at armature 519, at armature 536 opens the previously traced energizing circuit for the relay 482, and at armature 520, closes a circuit over conductor 549 for the relay 470. The relay 470, upon attracting its armature, closes a locking circuit for itself at armature 471 and, at armature 472, closes a circuit for an audible alarm (not shown) and the alarm lamp 473. The attention of the dispatcher is thus drawn to the fact that an operation has been performed at the substation and that there is to be a change in supervisory signals.

Referring now to the code-sending switch CD—1, Fig. 10, it will be remembered that the energization of the stepping magnet 1034 also opens the circuit of the slow-release relay 1033. After a short interval, this relay deenergizes and opens the circuit of the stepping magnet 1034 at armature 1051. The magnet 1034 merely deenergizes to advance the wipers 1055 to 1058, inclusive, into engagement with the first set of bank contacts and, at armature 1052, closes the circuit of the repeating relay 1001 and also the circuit of the relay 1033. The relay 1033 energizes to close the circuit of the stepping magnet 1034 and the repeating relay 1001 energizes to close the circuit of the sending relay 1127 in the radio transmitting apparatus, thereby again superposing the audio frequency vibrations upon the short wave radiated by the aerial 1101. This causes the deenergization of the relay 335 at the dispatcher's office, for the reasons mentioned before, and the consequent closure of the circuit of the line relay 507 of the connector switch H—1.

The alternate operation of the relay 1033 and the stepping magnet 1034 of the code sending switch CD—1 at the substation continues until the wipers 1055 to 1058, inclusive, are brought into engagement with the bank contact set which includes the bank contact 1061. When this occurs, a circuit is completed extending from ground by way of the armature 927 and its front contact, the front contact and the armature 924, the common conductor 962, the wiper 1013, bank contact 1017, the bank contact 1061, the wiper 1056, through the winding of the relay 1002 to battery. The relay 1002 is energized over this circuit and operates its armature 1006 to open the circuit of the stepping magnet 1034 and to prepare another circuit at the front contact of this armature for the said magnet. An additional result of the operation of the relay 1002 is that the circuit of the slow-release relay 1032 is opened at armature 1007. After a short interval of time, relay 1032 is deenergized to open the circuit of the slow-release relay 1031. Upon the retraction of the armature 1049 of relay 1031, a circuit is completed which extends from ground by way of the armature 1006 and its front contact, the back contact and the armature 1049, the front contact and the armature 1051, through the winding of the stepping magnet 1034, the wiper 1057 and its associated bank contact, and thence to battery by way of the armature 1046 and the front contact.

The magnet 1034 is energized over this circuit and actuates its armature to position its associated pawl and to open the circuit of the slow-release relay 1033 and also the circuit of the repeating relay 1001. The slow-release relay 1033 is deenergized, after an interval, to open the circuit of the stepping magnet 1034 which is deenergized to again close the circuit of the slow-release relay 1033 and to close the circuit of the repeating relay 1001. The operation of the magnet 1034, of course, advances the switch wipers 1055 to 1058, inclusive, into engagement with the next set of bank contacts. By this operation, the circuit of the relay 1002 is opened and this relay retracts its armature to thereby open, at armature 1006, the circuit of magnet 1034, and at armature 1007 closing a circuit for the relay 1032. The relay 1032 operates to close a circuit for the relay 1031. By the operation of these relays, the circuit of the magnet 1034 is again established. The alternate operation of the relay 1033 and the magnet 1034 again occurs until the wipers 1055 to 1058, inclusive, are advanced into engagement with the bank contact set which includes the bank contact 1063.

During the operation of the code-sending switch CD—1, while its wipers were being rotated in search of the bank contact set which includes the bank contact 1061, the circuit of the relay 1001 was intermittently opened and, consequently, the circuit of the line relay 507 of the connector H—1 (Fig. 5) through the intermediate action of the relay 1127 of the radio transmitting set at the substation and the relay 335 of the radio receiving set at the dispatcher's office. It is true that the slow-release relay 1033 indirectly controls the speed of operation of the relays 1001, 1127, 335 and 507. It is also true that, at each deenergization of the relay 507, the circuit of the relay 505 is opened.

In order to obviate any false operation which would occur were the relay 505 to be deenergized between the deenergizations of the relay 1033 in the switch CD—1, the time constant of the slow-releasing relay 1033 is materially faster than the time constant of the slow-releasing relay 505. Each time the circuit of the line relay 507 is opened, this relay is deenergized to open the circuit of the slow-releasing relay 505 and also to open the circuit of the stepping magnet 523. The magnet 523 is thus deenergized a plurality of times to advance the wipers 530 to 533, inclusive, into engagement with the bank contact set which corresponds to the number of interruptions in the audio frequency superposed on the short-wave carrier current received by the receiving aerial 305. The number of these interruptions is determined by the number of steps the code sending switch CD—1 at the substation has taken to find the bank contact set including the bank contact 1061. It will be assumed that the bank contact set selected by the connector H—1 includes the bank contact 540.

As the wipers of the connector H—1 have been rotated out of engagement with the normal set of bank contacts, the original energizing circuit of the relay 504 is opened. However, the relay 504 is not deenergized until the termination of the first series of impulses. This result obtains by reason of the fact that, at each retraction of the armature 521, a circuit is closed for the relay 504.

By the deenergization of the relay 504 at the end of the first series of impulses, the circuit of the slow-release relay 501 is opened at armature 514 and a circuit is closed at armature 516 which extends from battery by way of the back contact and the armature 516, conductor 562, through the winding of the relay 408, conductor 551, bank contact 540, wiper 530, the front contact and the armature 508, and thence to ground by way of the front contact and the armature 517.

The relay 408 is energized over the above circuit and operates to open the locking circuits of certain relays in the relay group RG—5 at armature 425, to close its own locking circuit at the front contact of the armature 425 to ground on the conductor 550, which has been previously grounded by the operation of the relay 506. Other results of the energization of the relay 408 are that, at armature 426, a selecting circuit is prepared and, at armature 428, a circuit is closed which extends from ground by way of the armature 509 and its front contact, conductor 559, armature 428 and its front contact, and through the winding of the relay 438 to battery. The relay 438 is energized over this circuit and controls certain circuits which will be described later.

Returning now to the operation of the code sending switch CD—1, (Fig. 10), when the wipers 1055 to 1058, inclusive, are brought into engagement with the bank contact set which includes the bank contact 1063, as previously described, a circuit is completed which extends from ground by way of the armature 927 and its front contact, the front contact and the armature 924, the common conductor 962, the wiper 1012, the bank contact 1016, the conductor 961, the armature 930 and its front contact, the conductor 966, the bank contact 1063, the wiper 1056, and through the winding of the relay 1002 to battery.

The relay 1002 is energized over the above circuit and it operates, as before, to open the circuit of the stepping magnet 1034 at armature 1006 and to open the circuit of the slow-release relay 1032 at armature 1007. The slow-release relay 1032 is deenergized to open the circuit of the slow-release relay 1031 which also retracts its armature after an interval. As a result of the latter operation, the stepping magnet 1034 is operated to open the circuit of the interrupter relay 1033, which retracts its armature to open the circuit of the stepping magnet 1034. The magnet 1034 is thus deenergized to advance the switch wipers 1055 to 1058, inclusive, into engagement with the next set of bank contacts. As a result of this operation, the circuit of the line relay 1002 is opened and this relay retracts its armature.

The deenergization of the relay 1002 opens the circuit of the stepping magnet 1034 and closes a circuit for the slow-release relay 1032. The relay 1032 is energized and it operates to establish a circuit for the relay 1031. The latter relay, upon being energized, reestablishes the circuit of the stepping magnet 1034. The stepping magnet 1034 now intermittently operates, under the control of the slow-release relay 1033, to advance the wipers 1055 to 1058, inclusive, until they are brought into engagement with the twenty-fifth set of bank contacts.

During the second advancement of the switch wipers of the code-sending switch CD—1, at each operation of the stepping magnet 1034, the circuit of the repeating relay 1001 is opened and, consequently, the circuit of the radio sending relay 1127. By the intermittent operation of the relay 1127, a series of interruptions is produced in the audio frequency modulation of the carrier current radiated by the aerial 1101. At the dispatcher's office, these interruptions in the superimposed audio frequency vibrations cause the relay 335 to be energized a plurality of times. As a result of the latter operation, a series of interruptions is produced in the circuit of the line relay 507 of the connector H—1 at the dispatcher's office. Upon each retraction of the armature 521 of the relay 507, the circuit of the stepping magnet 523 is opened and the magnet operates to advance the wipers 530 to 533, inclusive, into engagement with the bank contact set, which corresponds to the number of interruptions in the radio frequency modulation of the received carrier wave, which is determined by the second movement of the wipers of the code-sending switch CD—1 at the substation. It will be assumed that this contact set includes the bank contact 541.

When the wipers of the connector H—1 are brought into this position, no more interruptions are produced in the audio frequency vibrations superimposed on the radiated short waves until the slow-release relays 1032 and 1033 of the code-sending switch CD—1 are deenergized. During the advancement of the switch wipers of the connector switch H—1 at the dispatcher's office to their second resting position, when the wiper 531 engages the twelfth, thirteenth and fourteenth set of bank contacts, a circuit is completed for the relay 503. The relay 503, upon being energized, closes a circuit for the relay 501 at armature 511, at armature 512 prepares a circuit for maintaining itself energized, and at armature 513 removes battery from the conductor 561. Shortly after the wipers of the connector H—1 are brought into engagement with the bank contact set which includes the bank contact 541, previously described, the slow-release relay 503, which has been maintained energized during the rotation of the switch by the armature 521 of the line relay 507, retracts its armatures. As a result of the deenergization of the slow-release relay 503, the circuit of the slow-release relay 501 is opened at armature 511 and, at armature 513, a circuit is completed which extends from battery by way of the said armature and its back contact, the conductor 561, through the winding of the relay 405, the conductor 557, the bank contact 541, the wiper 530, the front contact and the armature 508, and thence to ground by way of the front contact and the armature 517. The relay 405 is energized over this circuit and operates to establish a locking circuit for itself at the armature 419 and to prepare a circuit at armature 420 for short-circuiting the relay 400.

As previously described, the code-sending switch CD—1 in the substation is stepped around until its wipers are brought into engagement with the twenty-fifth set of bank contacts after the termination of the second series of impulses. The wipers of the connector switch H—1 are also stepped in synchronism with the wipers of the code sending switch CD—1 and are brought to rest into engagement with their twenty-fifth set of bank contacts. This result is produced due to the fact that, during the third movement of the wipers of the code-sending switch CD—1, the repeating relay 1001 is intermittently operated as is the relay 1127 in the radio sending set at the substation. As before, the operation of the latter relay interrupts the audio frequency modulation of the short-wave carrier current. This, in turn, causes, at the dispatcher's office, the relay 335 to be deenergized a like number of times and to repeat these interruptions to the circuit of the line relay 507 of the connector H—1.

In the code-sending switch CD—1, the operation of the wipers 1055 to 1058, inclusive, to their twenty-fifth set of bank contacts opens the circuit of the relay 1027 and also the energizing circuit of the slow-release relay 1025. The relay 1027 immediately retracts its armatures. By reason of the peculiar construction of the armature 1039, previously described, this armature vibrates for an interval of time, thus alternately closing the circuit of the slow-release relays 1026 and 1025. For the reasons explained, the relay 1025 is the first to retract its armature. The deenergization of the relay 1025 prepares a circuit for the relay 1003.

Another result of the switch wipers of the code-sending switch CD—1 being brought into engagement with the twenty-fifth set of bank contacts is that a circuit is closed extending from ground by way of the wiper 1055, the bank contact 1060, and through the winding of the relay 1029 to battery. The relay 1029 operates to open another point in the relay 1025 at the armature 1044, and to close a circuit at the armature 1045 for the relay 1003. Upon being energized, the relay 1003 operates to establish another circuit for the relay 1028 at armature 1008 and to close a circuit at armature 1007 which extends from ground by way of said armature and its front contact, wiper 1011, bank contact 1015, conductor 960, and through the winding of the resistor 931 to battery. This circuit serves to short-circuit the relays 920 and 921. Consequently, these relays retract their armatures. The relay 920, upon retracting its armature, opens its locking circuit at the armature 923, also removes ground from the common conductor 962 at the armature 924, and at armature 925 removes one ground connection from the conductor 964. The deenergization of the relay 921 causes this relay to open its locking circuit at the armature 926 and to restore certain other circuits to normal.

At the connector H—1, the relay 507 is deenergized because of the fact that the radio sending relay 1127 remains energized for an interval after the wipers of the code-sending switch CD—1 in the substation engage the twenty-fifth set of bank contacts, thus maintaining a steady series of superimposed audio vibrations upon the short-wave carrier current. The relay 502 in the connector H—1 thus deenergizes and closes a circuit which extends from ground by way of the back contact and the armature 510, the conductor 560, through the winding of the relay 480, the armature 426 and its front contact, the front contact and the armature 420, and through the resistor 412 to battery. This circuit serves to shunt out the relay 400, which retracts its armature. The latter operation effaces the supervisory lamp 415 and closes a circuit for the supervisory lamp 417. By reason of these changes in supervisory signals, the dispatcher is apprised of changes in the position of the contactor 945 at the substation.

The relay 480 is energized in series with the shunting circuit of the relay 400, it being understood, of course, that the relay 480 is of low resistance. The relay 480 operates to open the locking circuit of the relay 482, which deenergizes. The operation of these relays is without function in the present instance as the signal controlling operation has been completed properly. The function of these relays will be described later.

Returning now to the operation of the switch CD—1, the slow-release relay 1026 is finally deenergized to open the circuit of the relay 1001 at armature 1037 and, at armature 1038, to open the circuit of the relay 1030. The deenergization of the relay 1030 opens the circuit of the slow-release relay 1032 at armature 1046 and, at the armatures 1047 and 1048, completes a circuit which extends from ground by way of the armature 1048 and its back contact, through the winding of the stepping magnet 1034, the armature 1047 and its back contact, the twenty-fifth bank contact with which the wiper 1058 is in engagement and the said wiper, and thence to battery by way of the back contact and the armature 1052. The stepping magnet 1034 is energized over this circuit and operates to restore the wipers 1055 to 1058, inclusive, to their normal position, whereupon the circuit of the magnet 1034 is opened and its operation ceases. As a result of the wipers of the code-sending switch CD—1 being brought to normal position, the circuit of the relay 1029 is opened and this relay is deenergized to open the circuit of the relay 1003. The slow-release relay 1032, upon retracting its armature, opens the circuit of the slow-release relay 1031 which is also deenergized. The relay 1003, upon retracting its armature, opens the circuit of the relay 1028 at armature 1008 and, at armature 1007', removes the shunt from the circuits of the relays 921 and 920.

It will be remembered that the relay 922 is in operated position, and, consequently, the relay 921 is again energized to establish a locking circuit for itself at armature 926. The operation of the other armatures of the relay 921 is without effect at this time, as the relay 920 is inert. The deenergization of the relay 1028 in the code-sending switch CD—1 restores certain circuits in the switch to their normal conditions. In addition, the deenergization of the relay 1028 opens the circuit of the relay 1160 in the radio transmitting device. The deenergization of the relay 1001, which occurred immediately after the deenergization of the slow-release relay 1026, opens the circuit of the relay 1127 in the radio transmitting set.

As the circuit of the relay 1127 is opened, this relay deenergizes to interrupt the oscillation of the oscillator triode 1123 and, consequently, the radiated short waves are no longer modulated by the audio frequency oscillations. At the receiving station, the relay 335 is consequently energized and opens the circuit of the line relay 507 of the connector H—1. As the circuit of the relay 507 is opened, this relay is deenergized to break the circuit of the slow-release relay 505. Upon retracting its armatures, the relay 505 closes a circuit for the stepping magnet 523 which extends from battery by way of the wiper 532 in engagement with the twenty-fifth bank contact, the back contact and the armature 524, the back contact and the armature 518, and through the winding of the stepping magnet 523 to ground. The stepping magnet 523 interrupts its own circuit and operates to restore the wipers 530 to 533, inclusive, to their normal position.

In the radio transmitting set at the substation, the deenergization of the relay 1160, which occurs responsive to the deenergization of the relay 1028 in the code sender CD—1, opens the circuit of the relay 1154. The relay 1154 deenergizes to remove the alternating current from the energizing circuits of triodes 1109, 1115 and 1123. That is, the deenergization of this relay deenergizes the filaments of the above-mentioned triodes and, in addition, removes the battery potentials from their plates.

In the above described manner, the apparatus is released following the sending of a supervisory signal to the dispatcher, notifying him of an automatic operation occurring in the substation.

It will be noted that the supervisory signal 417 is not actuated immediately after the two series of impulses which caused its selection. It is operated when the wipers of the connector switch H—1 are brought into engagement with their twenty-fifth set of bank contacts and remain there for an interval. By this circuit arrangement, false operation of the supervisory signals is prevented should either the switch CD—1 in the substation or the connector switch H—1 in the dispatcher's office get out of synchronism with the other, which frequently happens due to line disturbances caused by static line surges, inductive interference, flash over of insulators and the discharge of lightning arresters. In the event of any of these troubles occurring, the switches may get out of synchronism; thus, the wipers of each of the switches will not be in their twenty-fifth position simultaneously. Consequently, when the audio frequency modulation of the radiated short wave train is resumed, the wipers will not be in the same relative positions. The supervisory signals will not be operated and the answer-back operation will start all over again.

The manner in which the answer-back signal is started all over again will be described subsequently.

In the same manner as before described, any changes in position of any contactors or other apparatus units at the substation causes the finder switch F—1, the code-sending switch CD—1, the radio transmitting set in the substation, the radio receiving set, and the connector H—1 in the dispatcher's office to be operated to control the actuation of the supervisory signals.

Special provisions have been made whereby the load dispatcher is apprised of the load on the substation. This arrangement comprises a Kelvin balance ammeter A (Fig. 9) which is connected to an ammeter shunt in the main bus 940 of the substation. The Kelvin balance which is described in the "Standard Handbook for Electrical Engineers" 3—67, fifth edition—McGraw Hill Book Co. operates in a well-known manner to shift the contactor 933 to various positions as determined by the load on the substation.

In order to briefly describe this operation, it will be assumed that the contact maker 933 has been placed in connection with the contact 950. This operation closes a circuit for the relay 942. Upon operating, the relay 942, at armature 947, establishes a circuit for the relay 944 and, at its other armature, also places a potential upon the proper bank contact in the code-sending switch CD—1 of Fig. 10.

It will be noted that, while the relay 942 is in a deenergized condition, the circuit of the relay 943 was closed and this relay became energized to establish a locking circuit for itself and to prepare certain other circuits, as will appear. The relay 944, upon being energized, closes a starting circuit for the finder switch F—1 in the same manner as the relays 920 and 921, as before described. These relays cause the functioning of the finder switch F—1, the code-sending switch CD—1, the radio transmitting apparatus of Fig. 11, the radio receiving apparatus of Fig. 3, and the operation of the connector H—1 in the dispatcher's office, shown in Fig. 5. All the above operations occur in a manner similar to that already described.

By these operations, certain relays in the relay groups RG—4 and RG—5 are energized and locked in that position. It will be assumed that these relays are the relays 411 and 406. When the group selecting relay 411 of the first selecting group RG—5 is energized, a circuit is momentarily closed by the operation of the relay 501 of the connector H—1 for the relay 438 in the manner above described. The relay 438, upon operating, opens the locking circuit of that one of the relays, such as relay 435, 436 or 437, which may be energized, thus causing this relay to retract its armatures. This operation opens the circuit of a certain load-indicating lamp which may be lit.

Now, at the end of the selecting operation, when the wipers of the connector H—1 are in engagement with their twenty-fifth set of bank contacts, a circuit is closed in the usual manner for energizing the relay 435. This relay operates to establish a locking circuit for itself at armature 439 and, at armature 440, closes a circuit for the load-indicating lamp 450. This lamp will now continue to burn, indicating to the dispatcher that there is a certain particular load on the substation, until a change in load occurs, whereupon it is extinguished by a code being sent back and another lamp lighted.

In the above case, also, in case there is a false operation in the sending back of the code and the switches get out of synchronism, the answer-back signals so indicate and the sending back of the code is started over again, as will appear.

The operation of the alarm relay 470 calls the attention of the load dispatcher to the change in load, as has heretofore been described. The dispatcher then operates the key K—1 to stop the operation of the alarm.

Whenever any change in load occurs, the contact maker 933 on the Kelvin balance A is operated to open the circuit of the relay 942 and to close a circuit for a relay similar to it. It will be seen that there is a group of relays, such as relays 942, 943 and 944 provided for each contact of the contactor 933 of the Kelvin balance. These relays operate in a slightly different manner from the relays, such as relays 920, 921 and 922, which are associated with the other apparatus units and contactors in the substation.

It will now be assumed that the contactor 945 at the substation is open and the load dispatcher desires to close it. In order to accomplish this result, the dispatcher operates the double-throw key K in a direction to momentarily close the springs shown on the right.

The operation of the key K closes a circuit which extends from ground by way of the spring 100 and its working contact through the winding of the relay 106, conductor 183, the front contact and the armature 413, and thence to the battery. The relay 106 is energized over this circuit and operates to establish a locking circuit for itself at armature 173 over a path extending from ground by way of the spring 176 and its resting contact, armature 173 and its front contact, through the winding of the relay 106, the conductor 183, and thence to the battery by way of the front contact and the armature 413. The operation of the armature 172 of the relay 106 closes a circuit for the monitoring lamp 174. This lamp remains lighted during the sending operation even after the key K restores to normal, in order to inform the dispatcher that the desired code is being sent. Another result of the energization of the relay 106 is that, at armature 104, a circuit is completed which extends from ground by way of the armature 104 and its working contact, through the winding of the stepping magnet 109 of the finder switch F, the armature 132 and its back contact, and thence to the battery, by way of the back contact and the armature 120. As the stepping magnet 109 interrupts its own circuit, it operates as a buzzer to advance the switch shaft carrying the wipers 123 to 126, inclusive, until the said wipers are brought into engagement with the bank contact set comprising the contacts 127 to 130, inclusive, which is the contact set associated with the key K in the finder F.

When the switch wipers are brought into engagement with this set of bank contacts, a circuit is closed which extends from ground through the winding of the relay 108 by way of the common conductor 134, which is common to all the keys of the group, the front contact and the armature 101, the bank contact 130, the wiper 126, and through the winding of the relay 113 to the battery. The relay 113 is energized over this circuit and, upon operating, opens the circuit of the stepping magnet 109, thus stopping the operation of the finder switch F, and closes a circuit for the relay 111 over a path extending from battery by way of the armature 120 and its front contact, through the winding of the relay 111, the bank contact with which the wiper 160 is in engagement, and thence to ground by way of the said wiper, and, at armature 121, closes a circuit which extends from ground by way of the armature 121 and its front contact, through the winding of the slow-release relay 143, and thence to the battery, by way of the armature 152 and its back contact.

Another result of the energization of the relay 113 is that, at armature 122, a circuit is completed extending from ground by way of the armature 122 and its front contact, the conductor 188, and through the winding of the relay 270 to the battery. The energization of the relay 270 closes a circuit for the relay 254 at armature 271. The energization of the relay 254 operates to apply an alternating current to the power circuits of the radio transmitting station at the dispatcher's office. This alternating current energizes the filaments of the triodes 209, 215 and 223 through the step-down transformer 236. The rectifier 242 operates to rectify the alternating current and thus supplies a high direct-current potential to the plates of the triodes 209, 215 and 223. By the energization of the filament of the oscillator 209, the triode is caused to oscillate and these oscillations are radiated as short waves by means of the aerial 201 which is disposed in inductive relation to the transmission line 200. A short-wave carrier current is thus supplied to the transmission line.

In the finder switch F, the energization of the relay 111 causes the circuit of the slow-release relay 110 to be closed by the operation of the armature 117.

The armature 117 of the relay 111 is constructed in a manner similar to the armature of the relay 1027 of the code-sending switch CD—1 (Fig. 10) at the substation and, consequently, when the relay 111 becomes deenergized, the armature 117 vibrates for an interval afterwards. The slow-release relay 110, upon operating, at the armature 115 closes a circuit for the relay 140 and, at the armature 116, establishes a circuit which extends from ground by way of the armature 121 and its front contact, through the winding of the repeating relay 144, the front contact and the armature 116, and thence to the battery by way of the armature 152 and its back contact. The repeating relay 144, upon operating, at its armature 154 closes a circuit which extends from ground by way of the conductor 187, armature 154 and its front contact, conductor 186, through the winding of the sending relay 227 in the radio sending apparatus and thence to the battery.

The energization of the sending relay 227 connects one terminal of the primary winding of the howler transformer 225 to the positive pole of the grid biasing battery 230 at armature 276 and, at armature 275, connects the other terminal of the primary winding to the grid circuit of the modulator triode 223. This tube now oscillates at audio frequency in the same manner as the modulator tube of the transmitting set at the substation, previously described. The output of this oscillator is amplified by means of the amplifier triode 215 and modulates the short-wave train generated by the oscillator 209. It will be understood that the wave length or frequency of the short waves generated by the oscillator 209 is substantially different from those generated by the oscillator triode at the transmitting set at the substation. This provision is made, of course, in order to insure that the radiated waves will not interfere with each other. The modulated short-waves are, of course, transmitted along the transmission line 200 and are received at the substation by means of the receiving aerial 601, Fig. 6. The receiving set of Fig. 6 is, of course, normally tuned to be resonant with the frequency of the radiated short waves generated by the transmitting set at the dispatcher's office. By the operation of the detector triode 609, the audio frequency ocillations are detected from the modulated short wave and transferred to the amplifier triode 618. Here these vibrations are amplified and the output of the amplifier triode is connected to the primary of the transformer 626. The secondary of this transformer is connected to the grid circuit of the triode 629 which is connected in the circuit after the manner of a detector. In the plate circuit of the triode 629 is a receiving relay 625 which is normally energized by plate current ordinarily flowing. The received audio frequency vibrations are rectified by this tube and cause a great decrease in plate current, thereby causing the relay 635 to retract its armature. The deenergization of the relay 635 closes a circuit at armature 690 extending from ground through the upper winding of the relay 700, conductor 692, the back contact and the armature 690, conductor 691, and through the lower winding of the relay 700 of connector H to battery.

The relay 700 of the connector H is energized over this circuit and, upon operating, closes a circuit for the slow-release relay 702 in parallel with the stepping magnet 707. The magnet 707 is energized to place its associated pawl in position to actuate the switch shaft. The slow-release relay 702, upon being energized, closes a circuit for the slow-acting relay 703. The latter relay operates to energize the slow-release relay 706 over a circuit from ground through armature 711 and its front contact, winding of relay 706, front contact and armature 713 and battery to ground. The operations of these relays have the same functions as has been described in connection with the connector H—1 of Fig. 5.

Returning now to the operation of the code sending switch CD (Fig. 1), the relay 140, upon operating, at its armature 148 closes a circuit for the slow-release relay 141. The relay 141, upon attracting its armature, establishes a circuit for the slow-release relay 142. The latter relay upon being energized, closes a circuit which extends from ground by way of the armature 155 and its back contact, the front contact and the armature 151, the front contact and the armature 153, through the winding of the magnet 146, by way of the wiper 162 and its associated bank contact, and thence to battery by way of the front contact and armature 148. The stepping magnet 146 is energized over this circuit and operates to place its associated pawl in a position to actuate the switch shaft and also to open the circuit of the relays 144 and 143 at armature 152.

The deenergization of the relay 144 opens the circuit of the sending relay 227 in the radio transmitting set. The deenergization of the relay 227 disconnects the grid of the oscillator tube 223 from the howler transformer 225 and, consequently, the modulator triode ceases to oscillate. This interrupts the modulation of the short-wave carrier current and, as a result thereof, the relay 635 in the radio receiving apparatus at the substation operates to open the circuit of the line relay 700 of the connector H.

In the code-sending switch CD, the slow-release relay 143, upon being deenergized, opens the circuit of the stepping magnet 146, which is also deenergized, to reestablish the circuit of the relays 143 and 144 and to advance the switch wipers 160 to 163, inclusive, into engagement with their first set of bank contacts. The stepping of the code-sending switch CD continues under the control of the slow-release relay 143 until the wipers of the switch are brought into engagement with the bank contact set which includes the contact 165. When this occurs, a circuit is completed which extends from ground by way of the armature 103 and its front contact, the wiper 125, the bank contact 129, the bank contact 165, the wiper 161, and through the winding of the relay 145 to the battery.

The relay 145 is energized over this circuit and, upon operating, opens the circuit of the stepping magnet 146 at armature 155, at the front contact of this armature prepares another circuit for the magnet and, at armature 156, opens the circuit of the slow-release relay 141. The rotation of the wipers of the code-sending switch, of course, is interrupted. The slow-release relay 141, upon being deenergized, opens the circuit of the slow-acting relay 142. After a short interval, the slow-release relay 142 retracts its armature and closes a circuit which extends from ground by way of the armature 155 and its front contact, the back contact and the armature 151, the front contact and the armature 153, through the winding of the stepping magnet 146, the wiper 162 and bank contact with which the said wiper is in engagement, and thence to battery by way of the front contact and armature 148. The stepping magnet 146 operates to attract its armature, thereby placing its pawl in actuating position and opening the circuit of the slow-release relay 143 and also the circuit of the relay 144.

In accordance with the first movement of the wipers of the code-sending switch CD, a series of interruptions is produced in the circuit of the sending relay 227 of the radio sending set. This relay is deenergized a plurality of times in response thereto. At each deenergization, as before described, the audio frequency modulation of the radiated short-wave carrier current ceases and the receiving relay 635 in the radio receiving set at the substation energizes. Consequently, after each interruption in the circuit of the sending relay 227, the relay 635 at the substation energizes. In this manner, the interruptions are repeated in the circuit of the line relay 700 of the connector H, Fig. 7.

As a result of the retractions of the armature 709 on the line relay 700, the circuits of the slow-release relay 702 and the magnet 707 are opened and closed a plurality of times.

The deenergizations of the magnet 707 serve to advance the switch wipers 725 to 728, inclusive, into engagement with the bank contact set, which corresponds to the number of interruptions produced in the audio frequency modulation of the short-wave carrier current. This, in turn, is determined by the position of the wipers 160 to 163, inclusive, of the code-sending switch CD, Fig. 1.

At the first off-normal step of the connector switch H in the substation, the relay 701 is energized to place ground upon the conductor 760. It will be assumed that the bank contact set, to which the wipers 725 to 728, inclusive, are stepped, includes the bank contact 730.

During the interval that the slow-release relays 142 and 141 in the code-sending switch CD at the dispatcher's office are retracting their armatures, the slow-release relay 703 of the connector H, which has been maintained energized by the continued operation of the armature 709, is deenergized. As a result of this operation, a circuit is completed which extends from ground by way of the armature 711 and its front contact, the armature 721 and its front contact, wiper 725, bank contact 730, conductor 762, through the winding of the relay 806, conductor 771, and thence to the battery by way of the armature 715 and its back contact. The relay 806 is energized over this circuit and operates to close a locking circuit for itself at the armature 822 to ground on the conductor 760.

Adverting to the operation of the code-sending switch CD at the dispatcher's office, the slow-release relay 143, upon being deenergized, opens the circuit of the stepping magnet 146 which is also deenergized. The retraction of the armature of the magnet 146 advances the switch wipers another step and also closes the circuit of the interrupting relay 143 and the repeating relay 144. By the movement of the switch wipers, the circuit of the relay 145 is opened and this relay retracts its armatures to open the circuit of the magnet 146 and to close the circuit of the slow-release relay 141. The energization of the relay 141 also closes the circuit of the relay 142.

The operation of the relay 142 again starts the stepping operation of the magnet 146. The magnet 146 is now intermittently operated to advance the wipers 160 to 163, inclusive, into engagement with the bank contact set which includes the contact 166. A circuit is now closed which extends from ground by way of the armature 103 and its front contact, the armature 119 of the relay 108 and its front contact, the wiper 124, the bank contact 128, the bank contact 166, the wiper 161, and through the winding of the relay 145 to the battery. The relay 145 is energized to momentarily stop the operation of the switch wipers of the code-sending switch CD in the same manner as before described.

The repeating relay 144 operates to interrupt the circuit of the radio-sending relay 227 during the second movement of the switch wipers of the code sender CD. As a result thereof, the deenergizations of this relay produces a series of interruptions in the audio frequency vibrations superimposed upon the short-wave carrier current radiated by the transmitting aerial 201. In response to the interruptions in the audio frequency modulation of the carrier current, the relay 635 in the radio receiving set at the substation is successively deenergized and energized. The operation of this relay serves to repeat the interruptions to the circuit of the line relay 700 of connector H. The operation of the line relay 700 controls the action of the stepping magnet 707 in advancing the wipers 725 to 728, inclusive, into engagement with the proper bank contact set, which, it will be assumed, includes the bank contact 731.

At the termination of this series of interruptions, the radio receiving relay 635 remains deenergized and the line relay 700 remains energized. Consequently, the slow-release relay 704, which was energized by the switch wipers of the connector H being rotated past the twelfth, thirteenth and fourteenth set of bank contacts and which has been maintained energized by the operation of the armature of the line relay 700, is deenergized. By the deenergization of the relay 704, a circuit is closed which extends from ground by way of the front contact and the armature 711, the armature 721 and its front contact, the wiper 725, the bank contact 731, the conductor 768, through the winding of the relay 803, conductor 770, and the armature 719 and its back contact to the battery. The relay 803 is operated over this circuit and attracts its armatures to establish a locking circuit for itself at the armature 850 and to prepare a circuit at the armature 819 for the relay 904 of the apparatus control relays.

Going back to the operation of the code-sending switch CD at the dispatcher's office, the slow-release relays 141 and 142 operate as before and the magnet 146 is intermittently operated after an interval to advance the wipers 160 to 163, inclusive, into engagement with the twenty-fifth set of bank contacts.

When the wipers 160 to 163, inclusive, are brought into engagement with the twenty-fifth set of bank contacts, the circuit of the stepping magnet 146 is opened and its operation ceases temporarily. A circuit is also completed which extends from ground by way of the wiper 160 and its associated twenty-fifth bank contact, and through the winding of the relay 112 to the battery. The relay 112 is energized to prepare a circuit for the stepping magnet 109, the function of which will be described hereinafter.

Another result of the rotation of the wipers of the switch CD to their twenty-fifth position is that the circuit of the relay 111 is opened. The relay 111 is immediately deenergized, whereupon the armature 117 is caused to vibrate. The relay 110 is thus maintained energized for an interval after the relay 111 is deenergized.

In the same manner as before described, the operation of the repeating relay 144 causes the radio sending relay 227 to interrupt the audio frequency modulation of the radiated short-wave train whereby the relay 635 of the radio receiving set at the substation is caused to repeat the interruptions to the line relay 700 of the connector H. By the operation of the line relay 700, the wipers of the connector H are brought into engagement with their twenty-fifth set of bank contacts.

Now, during the interval that the relay 110 in the dispatcher's office is maintained energized, there is no interruption in the audio frequency modulation of the radiated short waves, the line relay 700 of the connector H remains energized and the slow-release relay 705 is deenergized. As a result of the latter operation, a circuit is completed which extends from the battery by way of the back contact and the armature 720, the conductor 769, the conductor 872, through the winding of the relay 904, the conductor 871, the armature 819 and its front contact, and thence to ground by way of the front contact and the armature 823. The relay 904 is operated over this circuit and closes a circuit at its armature 916 for the contactor 945 and, at the armature 915, closes a circuit for the relays 920 and 921. The operation of the relay 904 also causes certain other apparatus in the substation to function whereby the rotary converter RC is brought into operation, the contactor 945, of course, being closed. By the operation of the contactor 945 and the relays 920 and 921, an answer-back signal is given to the dispatcher whereby the supervisory signals at the dispatcher's office are actuated in order to notify him that the desired operation has taken place.

There is a slight difference in the operation of the answer-back in this instance, however, inasmuch as the relay 106 associated with the key K is locked energized. When the supervisory lamp 417 is lighted by the deenergization of the relay 400, which occurs responsive to the sending back of the answer-back signal, the relay 400 retracts its armature 413, thereby causing the relay 106 to be deenergized and the lamp 415 to be extinguished.

By the change in supervisory signalling devices, the dispatcher is informed that the desired operation has been completed at the substation.

The deenergization of the relay 106 opens the operating circuit of the finder switch F and the code-sending switch CD, insuring that the operating code will not be sent to the substation again.

The contact 915 on the relay 904 at the substation is provided so that, in case the contactor 945 should be in closed position, an answer-back signal will be given to the dispatcher in order to check his supervisory signals. If the contactor in 945 is in a closed position, the relay 922 is energized over the circuit including the contacts 946, as has already been explained. The energization of the relay 922 completes an energizing circuit for the relay 921. If now the relay 904 is energized, as explained above, and the circuit breaker is closed, a circuit is completed for the relay 920 over a circuit including the front contact and armature 915 and the front contact and armature 929. The relay 920 thus energizes and the code finder and code transmitter at the substation are set into operation in the manner which has been described in detail above. Since the relay 922 is energized, the code transmitter will be set for indicating a closed-circuit breaker.

The locking relay 106 also provides means whereby, if, for some reason or other, the code is not transmitted properly, the transmitting operation will occur repeatedly until the corresponding contactor or apparatus unit is operated in the substation.

By the conjoint action of the contacts 915 of the relay 904 at the substation and the locking relay 106 of the key K, provision is also made that, if the answer-back code is not transmitted properly, it will be sent back repeatedly until the proper indication is given to the dispatcher.

Since the locking circuit of the relay 106 can only be opened by the receipt of the correct supervisory code which, upon operating relay 400, opens the locking circuit of relay 106, this relay will remain locked until such receipt of the correct code, and, since, as long as the relay 106 remains energized the code transmitter at the dispatcher's office can not restore, but, instead operates to repeat the control code, the control code will be repeated to operate the relay 904 and the relay 904 will, as a result of its energization, transmit a supervisory code back to the dispatcher's office, in the manner described in detail above, until the proper supervisory code has been received and the relay 106 deenergized thereby.

It should be noted, of course, that, if no supervisory signal is operated when the connector H—1 is actuated, the relays 480 and 482 will cause the relay 191 to be energized. The results of the operation of this relay will be described subsequently. It will suffice to say at this time that the operation of this relay does not interfere with the repeating function as before described.

Returning now to the operation of the code-sending switch CD, it will be remembered that the circuit of the slow-release relay 110 is finally opened by the cessation of the vibration of the armature 111. The relay 110, upon being deenergized, opens the circuit of the slow-release relay 140 at the armature 115, at the armature 116 opens the circuit of the relay 144, and at the armature 114 closes a circuit which extends from the battery by way of the front contact of the armature 118 and the said armature, the armature 114 and its back contact, the back contact and the armature 132, through the winding of the stepping magnet 109, and the front contact and the armature 103 to ground. The magnet 109 is operated over this circuit to advance the wipers 123 to 126, inclusive.

The slow-release relay 140, upon being deenergized, opens the circuit of the slow-release relay 141 and closes a circuit which extends from ground by way of the armature 147 and its back contact, through the winding of the stepping magnet 146, the armature 149 and its back contact, the bank contact with which the wiper 163 is in engagement and the said wiper, and thence to the battery by way of the armature 152 and its back contact. The magnet 146 operates to restore the wipers 160 to 163, inclusive, to normal position. By this operation, the circuit of the relay 112 is opened and this relay is deenergized to open the circuit of the stepping magnet 109 of the finder switch F whereby the rotation of the wipers of the finder switch ceases. The slow-release relay 141, upon retracting its armature, opens the circuit of the slow-release relay 142 which is also deenergized. In the above manner, the sending apparatus is released in response to the transmitting of the sending operation.

The reason that the finder switch is given a number of steps at the end of the code transmitting operation is to allow the calls to be evenly distributed over the groups of keys. To explain more fully, assuming that another relay, such as relay 106, is operated in addition to the said relay, by the momentary operation of another key, such as K, were it not for the provisions made, the code corresponding to the operated relay would be transmitted indefinitely until the proper answer-back signal were recorded on the lamps, and there would be no actuating code sent out for the other relay which was operated. By means of the arrangement shown, this difficulty is obviated and one transmitting operation cannot indefinitely prevent the remaining operations.

The relay 113 of the finder switch F is, of course, deenergized as soon as the wiper 126 is rotated from engagement with the bank contact 130, when the circuit of the stepping magnet 109 is closed. If no other relay, such as 105 or 106 is operated, the finder switch may again rotate the wipers 123 to 126, inclusive, into engagement with the bank contacts 127 to 130, inclusive.

The deenergization of the relay 113, in addition to opening some of the local circuits of the finder switch F, opens the circuit of the relay 270 of the radio transmitting set whereby the filaments of the triodes 209, 215 and 223 are deenergized and the direct-current potential removed from the plate circuits of these tubes. The deenergization of the filaments of the various triodes, of course, shuts off the short-wave carrier current.

It will be seen that, when the relay 144 of the code-sending switch CD deenergizes, the circuit of the relay 227 in the radio transmitting set is opened and this relay, consequently, opens the oscillating circuit of the modulator 223 whereby the audio frequency modulation of the short-wave carrier current is interrupted. The relay 635 at the substation is thus energized to open the circuit of the line relay 700. The release of the connector H follows responsive to the deenergization of the line relay in the same manner as the release of the connector H—1, which was described previously.

It will be seen that, in the above-described case, the operating code from the dispatcher's office will continue to be sent until the correct answer-back signal is received from the substation in which the apparatus unit is located.

Thus, this necessitates that the transmitting aerial 201 shall be radiating short-wave carrier current at a certain wave length, while the receiving aerial 305 is receiving short-wave carrier current radiated by the transmitting apparatus at the substation. Under these conditions, unless some special provision is made, the receiving sets, at both the dispatcher's office and the substation, will be unable to receive a short wave generated by other than their associated transmitting sets. This is due to the fact that, inasmuch as aerials 201 and 305 are placed close together, the energy radiated by the aerial 201 will be much greater than the energy received from the radiations of the transmitting set at the substation. Even though the receiving set is tuned to different wave lengths, the short wave generated by the associated transmitting apparatus will render the receiving set incapable of receiving signals from other wave lengths due to the tremendous difference in power between the signals. In order to enable the receiving set to receive while the transmitting set is sending, my invention provides special circuit connections which allow this duplex operation to take place.

In order to describe the operation in this case, it will be assumed that the transmitting set of Fig. 2 is in operation and that an answer-back signal is being sent out from the substation. It will be seen that there is a connection 295 from the sending coil at a point below the ground connection extending by way of the conductor 364 through the variable condenser 380 to the receiving aerial. It will also be seen that there is another connection from the point 296 of the transmitting coil above the ground connection extending by way of the conductor 365 through a variable inductance 381 to the same point of the radio receiving aerial. Thus, there will be a transfer of energy from the transmitting set to the receiving set. By varying the capacity of the variable condenser 380 and the inductance of the variable inductance 381, the phase relation of the energy received by the receiving set of Fig. 3 can be adjusted so that this received energy is at a phase difference of 180° from the phase of the oscillations radiated from the aerial 201. By this arrangement, absolute neutralization of the short wave radiated by the aerial 201 is secured in the receiving set of Fig. 3. The radio receiving set of Fig. 3 can then be influenced by the received waves radiated by the transmitting set at the substation on different wave lengths.

At the substation, the radio transmitting and receiving sets are connected by the conductors 1180 and 1181 which contain the variable condenser 695 and the variable inductance 696 whereby the same result is secured in the receiving set of Fig. 6, as has been described in connection with the receiving set of Fig. 3.

In case the contactor 945 at the substation is closed and the dispatcher desires to open it, he operates the key K momentarily in the opposite direction to that previously operated, thus operating the spring shown on the left. The relay 105 is locked energized as a result of this operation, and the code for opening the contactor 945 is sent out, although the wipers 123 to 126, inclusive, of the finder switch F are brought into engagement with the bank contacts 127 to 130, inclusive. The difference in the code sent out is due to the fact that the common relay 108 is not energized at this time and, consequently, the wipers of the code-sending switch CD are stepped into engagement with the contact set which includes the bank contact 164 during their second movement. Thus, the number of interruptions in the audio frequency modulation of the short-wave carrier current is changed. Otherwise, the operations are similar to those described.

The dispatcher is also provided with a checking key K—5. This key is of such construction that it is adapted to remain in operated position until restored by the dispatcher. The operation of the key K—5 closes a circuit for the relay 191. The energization of the relay 191 places ground at armature 194 and, through the resistor 107, upon the wipers 123 and 125 at the armature 194, at the armature 193 places ground upon the bank contact 195 and, at the armature 192, closes a circuit for the stepping magnet 109.

By these operations, the finder switch F is operated to find the bank contact set which includes the bank contact 195. The code-sending switch is now operated to control the sending relay 227 of the radio transmitting apparatus whereby a series of interruptions is produced in the audio frequency modulation of the short-wave carrier current, and, consequently, in the circuit of the receiving relay 635 at the substation. The connector H is thus operated in a particular manner to select relays 901, 902 and 903 at the substation. These relays carry contacts for closing the circuits of all the relays, such as 920 and 921, in the substation. The operation of relays such as 920 and 921 causes the functioning of the finder switch F—1 and the code-sending switch CD—1, as well as the radio transmitting set thereat. Consequently, when the checking code is sent out, all the apparatus units codes will be sent back to the dispatcher in order to check the supervisory signals.

Under certain conditions, it will be seen that it may be desirable to operate a plurality of contactors, or other apparatus units, in the substation simultaneously in order to take care of standard operations or emergency conditions. To this end, I have provided a relay 906 which is adapted to close circuits at armatures 917, 918 and 919 for the particular contactors or apparatus units that it is desired to operate. The relay 906 is energized in the same manner as the relay 904. The operation of this relay and the contactors controlled by it will be apparent without further explanation.

The manner in which the answer-back code is automatically started over again will now be described. For this purpose, it will be assumed that an answer-back signal is being sent back from the substation and that, for some reason, the signal does not get through properly.

It will be seen that, immediately upon the slow-release relay 505 of the connector H—1 being energized, a circuit is closed extending from ground by way of the armature 536 and its back contact, the armature 535 and its front contact, the conductor 548, and through the winding of the relay 482 to the battery. The relay 482 is energized over this circuit and operates to establish a locking circuit for itself at armature 483 and to prepare a circuit at armature 484 for the relay 191. Immediately upon the first movement of the switch wipers of the connector H—1, the relay 506 is energized and the original energizing circuit of the relay 482 is opened, but this relay does not deenergize, due to its previously established locking circuit. Inasmuch as it has been assumed that the supervisory signal is not operated, the switch wipers of the connector H—1 are not in the twenty-fifth position when the time interval occurs by the audio frequency vibrations being superimposed upon the short-wave carrier current with the wipers of the code-sending switch CD—1 in their twenty-fifth position. Thus no circuit is completed for the supervisory lamp signals. Consequently, the relay 480 is not energized and the locking circuit of the relay 482 remains closed. This relay then remains operated after the deenergization of the relay 505 of the connector H—1 which occurs upon the release of the switch. When the relay 505 deenergizes, under the above conditions, a circuit is closed extending from ground by way of the armature 534 and its back contact, conductor 547, armature 484 and its front contact, conductor 184, and through the winding of the relay 191 to battery.

The energization of the relay 191 starts the finder switch F and the code-sending switch CD and the radio transmitting apparatus at the dispatcher's office to again function in the same manner, as before described.

At the substation, the operation of the radio receiving apparatus and the connector H serves to select the relays 901, 902 and 903 whereby the answer-back codes for the position of all the apparatus units are sent back. This circuit arrangement insures that the dispatcher will always have a correct indication before him by the supervisory lamps of the condition of apparatus units at the substation.

It will be seen that the provision of locking relays, such as relays 105 and 106, associated with the various keys also renders it impossible to send out an unnecessary code for the reason that, if the dispatcher should inadvertently throw the key K in the same direction as it had first been thrown, the opposite relay 105 or 106, as the case may be, would not be energized, as there would be no circuit for it, and no operation would occur. As no monitoring lamp is lighted, the dispatcher's attention is called to his mistake.

Under certain conditions, the dispatcher may find it desirable to release the connection in case he inadvertently operates a key or, for any other reason, he desires to stop the sending of the code. In order to accomplish this result, it is only necessary for the dispatcher to operate the key momentarily in the opposite direction. To describe this operation, it will be assumed that the key K is thrown to the right and that the relay 106 has been locked energized. To stop the code-sending operation, the dispatcher will throw the key to the left, thereby opening the locking circuit of the relay 106, which deenergizes and allows the sending apparatus to be restored to normal condition in the usual manner. The deenergization of the relay 106 opens the energizing circuit of the stepping magnet 109 at the armature 104, thereby preventing any further movement of the code-finder switches. A further result of the deenergization of relay 106 is to open the energizing circuit of the relay 113 at armature 101. The energization of the relay 113 opens the energizing circuit of the relay 111 which, in turn, opens the energizing circuit of the relay 110 at armature 117. After the interval of time, the relay 110 permits its armature 115 to drop to its back position, thereby deenergizing the relay 140. Upon the deenergization of the relay 140, the energizing circuit is completed for the relay 146 from ground over armature 147, its back contact, through the winding of relay 146, the armature 149 and its back contact, switch bank and wiper 163, the armature 152 and its back contact and battery to ground. The stepping magnet is energized over this circuit to prepare its pawl for stepping the wipers 160 to 163 and simultaneously opens its own energizing circuit at the armature 152. The stepping magnet 146 is thereupon deenergized and operates its pawl to step the wipers 160 to 163 to their next contact position. The armature 152 again closes its back contact, and the circuit for the stepping magnet previously traced is again closed. In this manner, the stepping magnet operates like a buzzer to step the wipers from contact to contact. At the twenty-fifth contact, the circuit for the relay 141 is opened at the switch bank and its wiper 162. The deenergization of the relay 141 opens the energizing circuit of the relay 142 at armature 150. The switch 146 is once again energized and deenergized, thereby stepping the wipers from their twenty-fifth to their first contact. At this position, the circuit for the stepping magnet 146, previously traced, is opened at the switch bank and its wiper 163 on its first contact. In this manner, the apparatus at the office is restored to normal. The relay 105 is not energized at this time for the reason that the relay 400 is energized and there is no battery connected to the winding of the relay 105. In the ordinary manner, the sending apparatus, including the equipment at the dispatcher's office and the substation, is restored to normal condition.

It will be understood that, in the system shown, there is another substation which has a duplicate of the apparatus shown in Figs. 6 to 11, inclusive. When the interruptions are produced in the audio frequency modulation of the carrier current generated by the dispatcher's station during the sending of a signal, the connector switch at the other substation as well as the connector switch H at the substation shown responds. Ordinarily, this would cause confusion if all the operations of each connector switch would cause selection of apparatus units. However, the operations can be split up so that in the same relative positions of the connector switches at the substations only one connector switch operates to select an apparatus unit, the operation of the other connector switch being without function. The connector switch in the other substation is, of course, released at the termination of a signal, upon the cessation of the audio frequency modulation of the short wave radiated from the dispatcher's office.

It is often desirable for the dispatcher to be able to communicate telephonically with an operator at any one of the substations. To accomplish this result, it is only necessary for the dispatcher to operate a key. The operation of this key causes the finder switch F to operate in the usual manner to select the key relay whereupon the code-sending switch CD is started into operation and the circuit is closed for energizing the triodes 209, 215 and 223 of the radio transmitting set, whereby the short-wave oscillator 209 is started into operation and short waves are radiated by the transmitting aerial 201.

In addition, by the operation of the relay 113, a circuit is closed for the repeating relay 144 which energizes to close the circuit of the radio sending relay 227. The energization of the latter relay connects the modulator tube 223 to the primary of the transformer 225. The modulator 223 immediately starts to oscillate and, through the intermediate action of the amplifier 215, modulates the radiated short waves at a suitable audio frequency, as has been described.

At the receiving set in the substation, the modulations are selected from the carrier wave and cause the retraction of the armature of the receiving relay 635. The deenergization of this relay, of course, closes the circuit for the line relay 700 of the connector H. Inasmuch as the particular key has been operated at the dispatcher's office, the code-sending switch CD is operated to send out certain definite series of impulses whereby the audio frequency modulation of the short wave is interrupted a plurality of times to control the receiving relay 635 at the substation. The operation of the latter relay, of course, reproduces the interruptions of the circuit in the line relay 700 of the connector H. The operation of the relay 700 causes the connector to operate in a manner similar to that already described.

By the operation of the connector switch H, the selecting relays 806 and 802 of the groups RG—1 and RG, respectively, are energized and, when the connector switch pauses for an interval in its twenty-fifth position, a circuit is closed extending from ground by way of the armature 823 and its front contact, the front contact and the armature 830, conductor 835, and through the winding of the relay 1163, conductor 836, conductor 769, and thence to battery by way of the armature 720 and its back contact. The energization of the relay 1163 closes a circuit at its armature 1195 extending from ground by way of the said armature and its front contact, through the windings of the relays 1168 and 1162 in multiple, the armature 1191 and its back contact, and thence to battery by way of the back contact and the armature 1198. The relay 1162 energizes to establish a locking circuit for itself and for the relay 1168 at armature 1197. The energization of the relay 1168 closes a circuit at the armature 1196 extending from battery by way of the front contact and the said armature, and through the bell coils to ground. This circuit causes the operation of the bell or signalling device 1159 to draw the attention of the operator at the substation to the fact that the dispatcher is calling.

When the signal ceases to be sent out from the dispatcher's office, the audio frequency modulation of the short wave radiated by the transmitter in the dispatcher's office ceases and the connector H and the selected relays are released. The signalling device 1159 does not stop operating, due to the fact that there has been a locking circuit established for the relays 1168 and 1162.

At the dispatcher's office, the dispatcher will remove the receiver 251 from the switch hook. The operation of the switch hook closes a circuit extending from ground by way of the switch hook and through the winding of the relay 248 to battery.

The energization of the relay 248 connects the transmitter 246 in circuit with the primary winding of the transformer 245. By the operation of the switch hook another circuit is closed extending over conductor 362 and through the winding of the relay 341 to battery. The energization of the relay 341 disconnects the detector tube 329 and connects the output of the amplifier triode 318 to the primary winding of the transformer 344. The secondary winding of the transformer 344 is connected in circuit with the the receiver 251 of the telephone T. Inasmuch as the transmitter is connected in circuit with the primary of the transformer 245, the secondary of which is connected in the grid circuit of the modulator triode 223, the oscillation of the modulator 223 will be controlled in accordance with the voice waves and will modulate, through the intermediate operation of the amplifier triode 215, the short wave train generated by the oscillator triode 209. This operation superimposes audio frequency vibrations upon the generated carrier wave in the usual manner.

At the substation, when the operator thereat responds, he will remove the receiver 1151 from the switch hook. This operation closes a circuit for the relay 1148. It also closes a circuit extending from ground by way of the switch hook springs, conductor 1183, and through the winding of the relay 641 to the battery. The energization of the relay 641 disconnects the detector triode 629 and connects the output of the amplifier 618 to the primary of the transformer 644. The secondary of the transformer 644 is connected in circuit with the receiver 1151. The energization of the relay 1148 connects the transmitter 1146 in circuit with the primary winding of the transformer 1145. In the usual manner, by speaking in the transmitter 1146, it is possible to modulate the short wave generated by the oscillator triode 1109 and radiated by means of the aerial 1101. The operation of the relay 1148 opens the locking circuits of the relays 1168 and 1162. These relays deenergize to stop the signalling operation. By the operation of the switch hook, a circuit is also completed for the relay 1152 which functions as before to connect energy to the filament and plate circuits of the triodes 1109, 1115 and 1123, whereby the short waves are radiated.

As before described, at both the dispatcher's office and the substation, the transmitting set is connected to the receiving set in order to secure neutralization of the radiated waves so that the receiving set may be affected by the wave from the other station. By using the instrumentalities provided, it is thus possible to communicate between the substation and the dispatcher's office in the same manner as it is possible to communicate over an ordinary wire telephone.

The hanging up of the receiver at the dispatcher's office disables the transmitting set and deenergizes the triodes 209, 215 and 223.

At the substation, the replacement of the receiver 1151 deenergizes the triodes 1109, 1115 and 1123.

In addition, at both the dispatcher's office and substation, the replacement of the receiver renders the receiving set effective to receive the code impulses, as previously described.

Yet it may happen that the dispatcher will call the substation in the manner heretofore described and there will be no operator there. In this event, inasmuch as the locked signalling device 1159 is operated, the dispatcher finds it desirable to release it. In order to do this, he will operate his key associated with that substation, whereby a code of impulses are sent out and the connector H operates to select the relay 1190 which is operated when the connector H pauses in its twenty-fifth position. The energization of the relay 1190 opens the locking circuit of the relays 1168 and 1162 and the operation of the signalling device is stopped.

In the event that the operator at the substation desires to call the dispatcher, the operator will close a key, such as K—7 (Fig. 9). As a result of this operation, a circuit is closed extending through the winding of the relay 980 and through the resistor 986 to the battery. The relay 980 is energized over this circuit and, upon operating, at its armature 983 establishes a locking circuit for itself, and at its armature 982 closes a circuit for the magnet 1004 of the finder switch F—1.

In the same manner as before described, a code of impulses is generated by the conjoint action of the finder switch F—1 and the code sending switch CD—1. In accordance with this impulse code, the audio frequency modulation of the short wave radiated by the transmitting aerial 1101 is interrupted to produce a corresponding series of deenergizations of the receiving relay 335 in the receiving set at the dispatcher's office, whereby the connector H—1 is operated to select the selective relays 409 and 406 whereby the relay 258 (Fig. 2) is selected.

The relay 258 is energized when the connector H—1 pauses in its twenty-fifth position. Upon energizing, the relay 258 closes a circuit at its armature 275' for the relays 261 and 262. The energization of these relays closes a circuit for the signalling device 259 and also a locking circuit for themselves. By the operation of the signalling device, the dispatcher is apprised that he is being called by an operator from one of the substations.

When the dispatcher responds by removing the receiver 251, the relay 248 is energized and the locking circuits of the relays 261 and 262 are opened, and these relays deenergize to stop the operation of the signalling device 259. Conversation may now take place, in a manner before described, between the operator at the substation and the dispatcher. The replacement of the receivers at the substation and the dispatcher's office causes the cessation of the short-wave generation and the deenergization of the triodes in the transmitting sets at both the substation and the dispatcher's office.

It will be noted that, in the dispatcher's office, there is no means for stopping the operation of the signalling device from the substation. This is due to the fact that someone will be in attendance in the dispatcher's office at all times and, consequently, an answer will always be obtained. Therefore, there is no necessity for unlocking the relays 261 and 262.

If desirable, it is, of course, possible to inform the dispatcher when he is attempting to signal an operator at the substation when the signalling device 1159 is operating by causing a code to be sent back to the dispatcher. This code would be arranged to stop the sending out of the code at the dispatcher's office. The manner in which these results may be accomplished will be apparent without further explanation.

The operation wherein an operator at one substation calls an operator at another substation will now be described. It will be seen from the preceding description that the receiving sets at all the substations are tuned to the same wave length, which is the wave length of the transmitting set at the dispatcher's office. In order to enable one substation to communicate with another substation, it is therefore necessary to change the wave length of the transmitting set at that substation to the same wave length as that of the dispatcher's office. Likewise, for the same reasons, it is necessary to change the wave length of the receiving set at the substation to that of the receiving set at the transmitting station. By this arrangement, it is possible for one substation to communicate with any of the others the same as the dispatcher's station may communicate with the substations. The operations wherein this change in wave length of the transmitting and receiving sets of one substation is brought about, will now be described.

In order to call another substation, the operator will operate a key similar to the key K—7 which will cause the functioning of the finder switch F—1 and the code-sending switch CD—1 to generate the proper code. The operation of this key also closes certain contacts, which are shown at the key K—6 (Fig. 11), whereby the relay 1158 is energized. The relay 1158, upon energizing, operates to close, at its armature 1138, the circuit of the relay 1157. The latter relay, upon operating, closes a circuit for the relay 1141 at the armature 1139 from the source of alternating current. The relay 1141 at the armature 1135 changes the connection of the radiating aerial 1101 to another point on the helix, whereby the wave length of the transmitting set of Fig. 11 is changed to the same wave length as that of the dispatcher's office.

Other results of the energization of the relay 1141 are that a locking circuit is established for itself at the armature 1136 and, at the armature 1134, a circuit is completed extending from the battery by way of the front contact and the said armature, the conductor 1182, and through the winding of the relay 651 to ground. The energization of the relay 651 closes a circuit at its armature 670 whereby the variable condenser 653 is placed in parallel with the variable condenser 604. The relay 652 is energized in multiple with the relay 651. Upon operating, relay 652 connects the variable condenser 654 in multiple with the condenser 610. As a result of these operations, the wave length of the receiving antenna 601 is changed to that of the dispatcher's receiving set. The transmitting set of Fig. 11 is thus capable of interrupting the audio frequency modulations of the radiated vibrations whereby the receiving sets at the other substations respond. Hence, from this point, the operations are the same as has been previously described.

My invention is not limited to the particular arrangement of the apparatus described but may be variously modified without departing from the spirit and scope thereof, as set forth in the appended claims.

I claim as my invention:

1. In a signalling system, a first station, a second station, apparatus units at said second station, a power-transmission line connecting said stations, an operating code transmitter at said first station, operating from position to position for transmitting code signals, an operating code receiver at said second station, operated from position to position by said transmitted code, means for superimposing a carrier current on said power line, means including said code transmitter for modulating said carrier current in accordance with a code combination of impulses, means including said code receiver responsive to said code as said receiver moves from position to position for conditioning one of said apparatus units for operation, means operative thereafter at a predetermined position of said transmitter for transmitting a check impulse and means operative in the event that the receiver is on a corresponding position when the check impulse is transmitted for completing the operation of said conditioned apparatus unit.

2. In a supervisory-control system, a first station, a second station, a plurality of apparatus units at said second station, a power line connecting said stations, means for superimposing a carrier current on said power line, a rotatable code transmitter at said first station for transmitting code signals to said second station, a rotatable code receiver at said second station controlled by the transmitted code, means including said code transmitter for modulating said carrier current in accordance with predetermined code signals, means including said code receiver for conditioning one of said apparatus units for operation in accordance with said modulated code, means at a predetermined position of said transmitter for transmitting a check impulse to the receiver and means controlled by said check impulse and operative in the event that the receiver is on a corresponding position when the check impulse is transmitted, for completing the operation of said conditioned selected apparatus unit.

3. In a signalling system, a first station, a second station, apparatus units at said second station, a finder switch having a position individual to each of said apparatus units, a code sender at said second station, a code receiver at said first station, signalling devices individual to said apparatus units at said first station, an oscillator including electron discharge devices at said second station, the filaments of said devices being normally open-circuited, means responsive to the operation of one of said apparatus units for operating said finder switch to the position individual to said operated apparatus unit, means operative following the movement of said switch to said position for closing the circuit of said filaments, said oscillator, upon closing of the circuit, generating a carrier current, means including said finder responsive to the operated unit for modulating said carrier in accordance with a predetermined code combination of impulses and means responsive to said code for operating the signalling device individual to said operated unit.

4. In a supervisory-control system, a first station, a second station, a power line connecting said stations, a plurality of apparatus units at said second station, means for transmitting modulated carrier currents, over the power line, in accordance with a predetermined code from said first to said second station, means including tuned circuits at said second station responsive to said codes for selecting one of said apparatus units for operation, means operative in the event that said apparatus unit fails to operate, for repeating the code to said second station until said unit operates, means including circuits at said second station responsive to the operation of said apparatus unit for transmitting code combinations of modulated carrier currents over said power line from said second to said first station whereby said carrier currents from said first and second stations are transmitted simultaneously, and means for adjusting the circuits of said receiver at said second station 180° out of phase with respect to the transmitter thereat whereby the operation of said second station transmitter does not affect the receiver thereat.

In testimony whereof, I have hereunto subscribed my name this 26th day of September, 1923.

ROY J. WENSLEY.